US012601272B2

(12) United States Patent
Perdrigeon et al.

(10) Patent No.: US 12,601,272 B2
(45) Date of Patent: Apr. 14, 2026

(54) PITCH CHANGE MECHANISM WITH AN ACTUATOR SURROUNDING A FLUID TRANSFER BEARING

(71) Applicant: Safran Aircraft Engines, Paris (FR)

(72) Inventors: Christophe Marcel Lucien Perdrigeon, Moissy-Cramayel (FR); Clément Cottet, Moissy-Cramayel (FR); Jean Charles Olivier Roda, Moissy-Cramayel (FR); Régis Eugène Henri Servant, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/876,240

(22) PCT Filed: Jun. 22, 2023

(86) PCT No.: PCT/FR2023/050943
§ 371 (c)(1),
(2) Date: Dec. 18, 2024

(87) PCT Pub. No.: WO2023/247906
PCT Pub. Date: Dec. 28, 2023

(65) Prior Publication Data
US 2025/0369363 A1    Dec. 4, 2025

(30) Foreign Application Priority Data
Jun. 22, 2022    (FR) ....................................... 2206140
Oct. 28, 2022    (FR) ....................................... 2211295

(51) Int. Cl.
*F01D 7/00*        (2006.01)
*B64C 11/38*       (2006.01)

(52) U.S. Cl.
CPC ................ *F01D 7/00* (2013.01); *B64C 11/38* (2013.01); *F05D 2260/70* (2013.01)

(58) Field of Classification Search
CPC ......... F01D 7/00; B64C 11/38; F05D 2260/70
See application file for complete search history.

(56) References Cited

U.S. PATENT DOCUMENTS

| | | |
|---|---|---|
| 4,753,572 A | 6/1988 | Kusiak |
| 4,884,466 A | 12/1989 | Duruisseau |

(Continued)

FOREIGN PATENT DOCUMENTS

| | | |
|---|---|---|
| EP | 0 168 942 A1 | 1/1986 |
| EP | 0 275 504 A2 | 7/1988 |

(Continued)

*Primary Examiner* — Michael L Sehn
(74) *Attorney, Agent, or Firm* — Birch, Stewart, Kolasch & Birch, LLP

(57)        ABSTRACT

The invention relates to a pitch change mechanism (70) comprising a frame (72), an actuating cylinder (74) having a moving part (102) capable of translating relative to the frame (72), and a linkage system (78) connecting the moving part (102) to a variable-pitch vane (56) so as to convert the translation of the moving part (102) into a rotation of the variable-pitch vane (56). It further comprises a fluid transfer bearing (257) for supplying the actuating cylinder (74) with actuating fluid from a source (76) relative to which the actuating cylinder (74) is capable of rotating. The actuating cylinder (74) extends at least partly around the fluid transfer bearing (257).

16 Claims, 12 Drawing Sheets

(56)     References Cited

U.S. PATENT DOCUMENTS

| | | | | |
|---|---|---|---|---|
| 8,545,178 | B2 * | 10/2013 | Perkinson | B64C 11/40 |
| | | | | 416/27 |
| 10,793,255 | B2 * | 10/2020 | Miszkiewicz | F02C 3/04 |

FOREIGN PATENT DOCUMENTS

| | | | |
|---|---|---|---|
| EP | 1 832 509 | B1 | 10/2011 |
| EP | 3 138 771 | A1 | 3/2017 |
| FR | 2 941 493 | A1 | 7/2010 |
| FR | 3 098 268 | B1 | 1/2021 |
| WO | WO 95/08860 | A1 | 3/1995 |

* cited by examiner

PITCH CHANGE MECHANISM WITH AN ACTUATOR SURROUNDING A FLUID TRANSFER BEARING

FIELD OF THE INVENTION

This invention relates to the general field of turbomachines equipped with at least one fan provided with variable-setting blades, and more particularly the control of the orientation of the fan airfoils of these turbomachines.

A preferred field of application of the invention is that of turbojet engines with ductless fans (better known as propfan, open fan, open rotor and unducted fan engines.) However, the invention is also applicable to turboprop engines with one or more propellers.

TECHNICAL BACKGROUND

One of the avenues currently being explored to improve the specific power consumption of civil airplane engines consists in the development of unducted-fan turbojet engines, such as that described in document FR 2 941 493. These turbojet engines include a conventional turboshaft gas generator, one or more turbine stages of which drive one or more unducted fan rotors extending outside the nacelle of the engine, usually by way of a reduction gear allowing the fan rotor to rotate at a lower speed than that of the turbine stage(s).

The blades of this rotor or these rotors are, as in the case of conventional turboprop engines, of variable setting, i.e. the angular position of these blades (known as the setting angle) can be modified during flight. As a reminder, the setting angle of a blade is equivalent to the angle, in a plane orthogonal to the pivot axis of the blade, between the axis of rotation of the fan and the chord of the blade at 75% of the radius of the fan. It may vary from a value equal to 90°, corresponding to a so-called "flat" position of the blade, to a value equal to 0°, corresponding to a so-called "feathered" position of the blade. It can also take a value strictly greater than 90°, typically substantially equal to 95°, corresponding to a so-called "reverse" position of the blade.

As is known, this modification of the setting angle during flight makes it possible to vary the thrust of the engine and optimize the efficiency of the fan as a function of the speed of the aircraft. Specifically, the rating of fans is virtually constant over all the operating phases, and it is the blade setting that causes the thrust to vary. Thus, in the cruise flight phase, the blades are oriented so as to adjust the thrust by minimizing the power taken off the turbine shaft and the power consumption and by optimizing the efficiency. Conversely, at take-off, the blades are oriented so as to maximize the thrust in order to accelerate, then to make the airplane take off.

The control of the orientation of the blades is commonly done by means of a pitch change mechanism comprising a control actuator including a part translationally movable along the axis of the fan and a linking system linking the movable part to the blade so as to convert the translation of the movable part into rotation of the variable-setting blade. This control actuator is generally a hydraulic cylinder supplied with fluid by a source secured to the nacelle of the turbomachine, which requires provision to be made for a rotating transfer between the part of the duct that is immovable in the nacelle reference frame and the part of the duct that rotates with the fan rotor. This rotating transfer is usually done by means of a rotating fluid transfer mechanism commonly known as a "fluid transfer bearing".

Conventionally, the fluid transfer bearing is positioned upstream of the reduction gear, around the fan shaft. This arrangement does however have many disadvantages:
  since the fan shaft traverses the fluid transfer bearing, this is found to be particularly bulky, and
  by inserting the fluid transfer bearing between the control actuator and the reduction gear, the turbomachine is elongated and its weight is thus increased, which increases its power consumption.

To remedy these problems, provision has been made for placing the fluid transfer bearing downstream of the reduction gear and for linking it to the control actuator by a tube traversing the reduction gear. This is the arrangement that is found on most turboprop engines at present. While this arrangement is suitable for turbomachines, the fan shaft of which is offset with respect to the turbine shaft, as on the great majority of turboprop engines, it does present difficulties in the event of integration into a turbomachine, the fan shaft of which is coaxial with the turbine shaft, as is the case for unducted-fan turbojet engines. Specifically, in such a case, the following limitations arise:
  access to the fluid transfer bearing is made difficult, and
  since the fluid transfer bearing is traversed by the turbine shaft, it proves particularly bulky.

Thus, none of the existing solutions provide satisfaction when it comes to equipping a turbomachine, the fan shaft of which is coaxial with the turbine shaft, with a fluid transfer bearing intended to supply a pitch change mechanism of a fan rotor.

SUMMARY OF THE INVENTION

One aim of the invention is to facilitate access to a fluid transfer bearing intended to supply a pitch change mechanism of a fan rotor equipping a turbomachine, the fan shaft of which is coaxial with the turbine shaft, while minimizing the length of the turbomachine. Another aim is to minimize the bulk of the fluid transfer bearing.

For this purpose, a subject-matter of the invention, according to a first aspect, is a pitch change mechanism for adjusting an angular position of at least one variable-setting blade around a pivot axis of the blade, said pitch change mechanism comprising:
  a frame which is fixed in relation to the pivot axis,
  a control actuator including a fixed part secured to the frame and a movable part, translationally movable along a longitudinal axis in relation to the fixed part between a retracted position and an extended position,
  a linking system linking the movable part to the variable-setting blade so as to convert the translation of the movable part along the longitudinal axis into a rotation of the variable-setting blade about the pivot axis, and
  a fluid transfer bearing for supplying the control actuator with actuating fluid coming from a source in relation to which the control actuator is rotationally movable about the longitudinal axis,
  wherein the control actuator extends at least in part around the fluid transfer bearing.

According to particular embodiments of the invention, the pitch change mechanism also has one or more of the following features, taken in isolation or in any technically possible combination:
  the control actuator is coaxial with the fluid transfer bearing;
  the control actuator extends around more than half, advantageously around more than three quarters, of the fluid transfer bearing;

the pitch change mechanism comprises a pitch locking device suitable for locking the translation of the movable part in relation to the fixed part in at least one direction, said pitch locking device comprising:

a locking member, translationally movable in relation to the frame along the longitudinal axis between an operating position and a locking position, a biasing device biasing the locking member into its locking position, and a retaining device for retaining the locking member in its operating position under normal operating conditions, the retaining device comprising a counterbalance actuator including a counterbalance chamber supplied with actuating fluid to counterbalance the biasing of the biasing device, the fluid transfer bearing being configured to supply the counterbalance actuator with actuating fluid coming from the source;

the fluid transfer bearing comprises a stator and a rotor jointly movable with the control actuator about the longitudinal axis in relation to the stator, the rotor extending around the stator;

the fluid transfer bearing comprises a plurality of circuits independent from one another, at least one of said circuits comprising:

an axial duct fashioned in the stator, at least one radial orifice fashioned in the stator and linking the axial duct to the periphery of the stator, a circumferential groove fashioned between the rotor and the stator and into which the or each radial orifice opens, and at least one radial duct, fashioned in the rotor, extending radially from the groove all the way to a supply channel formed in the frame or between the frame and the fluid transfer bearing;

the axial ducts of the different circuits are coaxial;

the control actuator comprises a first and a second fluid chamber each containing actuating fluid for actuating the displacement of the movable part in relation to the fixed part, and the fluid transfer bearing comprises a first circuit fluidly connected to the first fluid chamber for supplying said first fluid chamber with actuating fluid provided by the source and a second circuit fluidly connected to the second fluid chamber for supplying said second fluid chamber with actuating fluid provided by the source;

Another subject-matter of the invention, according to a second aspect, is a fan rotor for a turbomachine comprising a hub and a plurality of variable-setting blades each pivotable in relation to the hub about a respective pivot axis, the rotor further comprising a pitch change mechanism according to the first aspect for adjusting an angular position of each of the variable-setting blades around its respective pivot axis.

According to particular embodiments of the invention, the fan rotor also has one or more of the following features, taken in isolation or in any technically possible combination:

the fan rotor comprises a guide bearing for rotationally guiding, about the longitudinal axis, said fan rotor in relation to a turbomachine nacelle, said guide bearing having an inner diameter greater than an outer diameter of the fluid transfer bearing; and the longitudinal axis constitutes an axis of rotation of the rotor.

A further subject-matter of the invention, according to a third aspect, is a turbomachine comprising a fan rotor according to the second aspect.

According to a particular embodiment of the invention, the turbomachine also has the following feature:

the longitudinal axis constitutes an axis of elongation of the turbomachine.

Still another subject-matter of the invention, according to a fourth aspect, is an aircraft comprising at least one turbomachine according to the third aspect.

A final subject-matter of the invention, according to a fifth aspect, is a method for changing the pitch of the blades of a fan rotor for a turbomachine, each one pivotable in relation to a hub of the fan rotor about a respective pivot axis, said method comprising the adjustment of an angular position of each of said blades around its respective pivot axis by means of a pitch change mechanism according to the first aspect.

According to a particular embodiment of the invention, the method also has the following feature:

the method comprises an additional step of locking the orientation of the blades by means of the pitch locking device.

BRIEF DESCRIPTION OF THE FIGURES

Other features and advantages of the invention will become apparent on reading the following description, given solely by way of example and with reference to the appended drawings, wherein.

DETAILED DESCRIPTION OF AN EXEMPLARY EMBODIMENT

Figure 1:
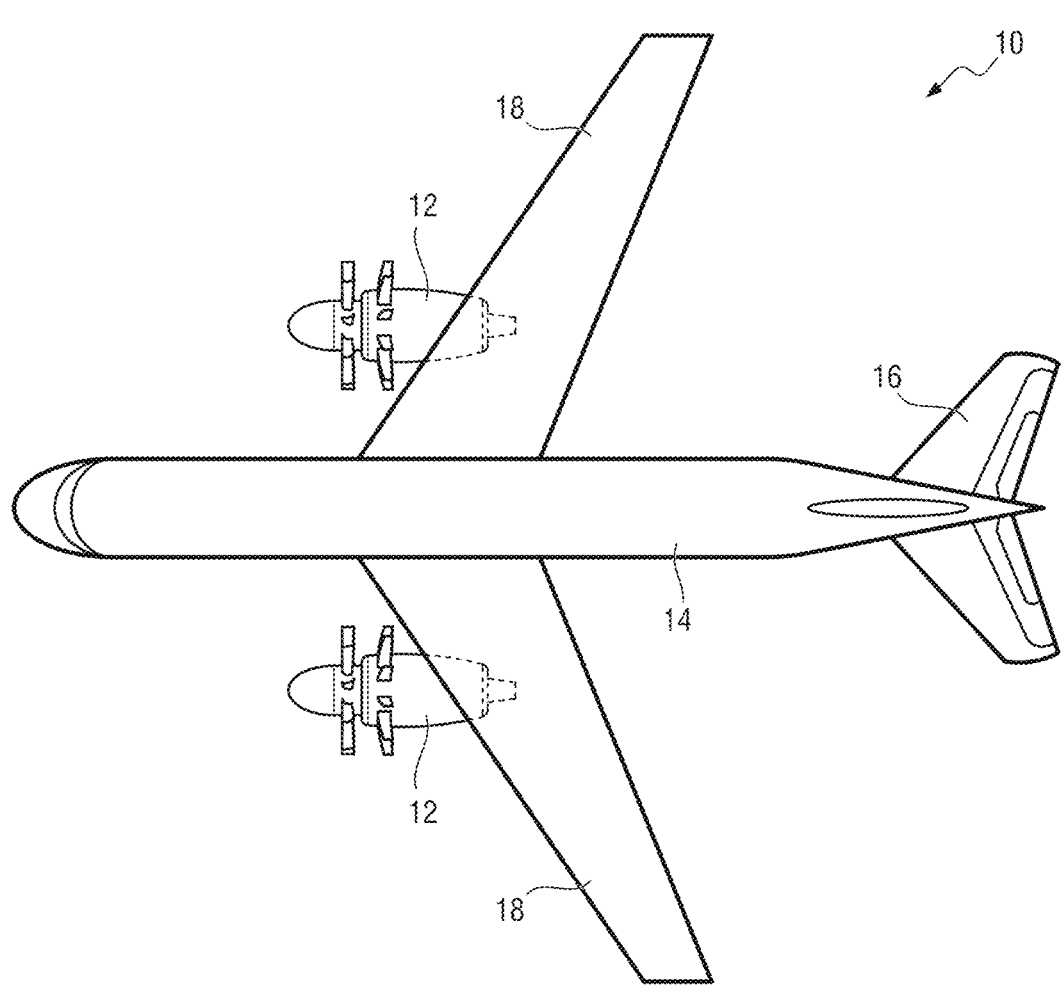
FIG. 1 is a top view of an aircraft according to an exemplary embodiment of the invention.

The aircraft 10 shown on FIG. 1 comprises turbomachines 12 to propel it.

In the example shown, the aircraft 10 is an airplane. This comprises, conventionally, a fuselage 14, a tail 16 and two wings 18. Here the turbomachines 12 are two in number and are each housed under a respective wing 18. In a variant (not shown), the turbomachines 12 are disposed along the fuselage 14, for example in proximity to the tail 16. Still as a variant (also not shown), the aircraft 10 comprises a single turbomachine 12 or at least three turbomachines 12.

Figure 2:
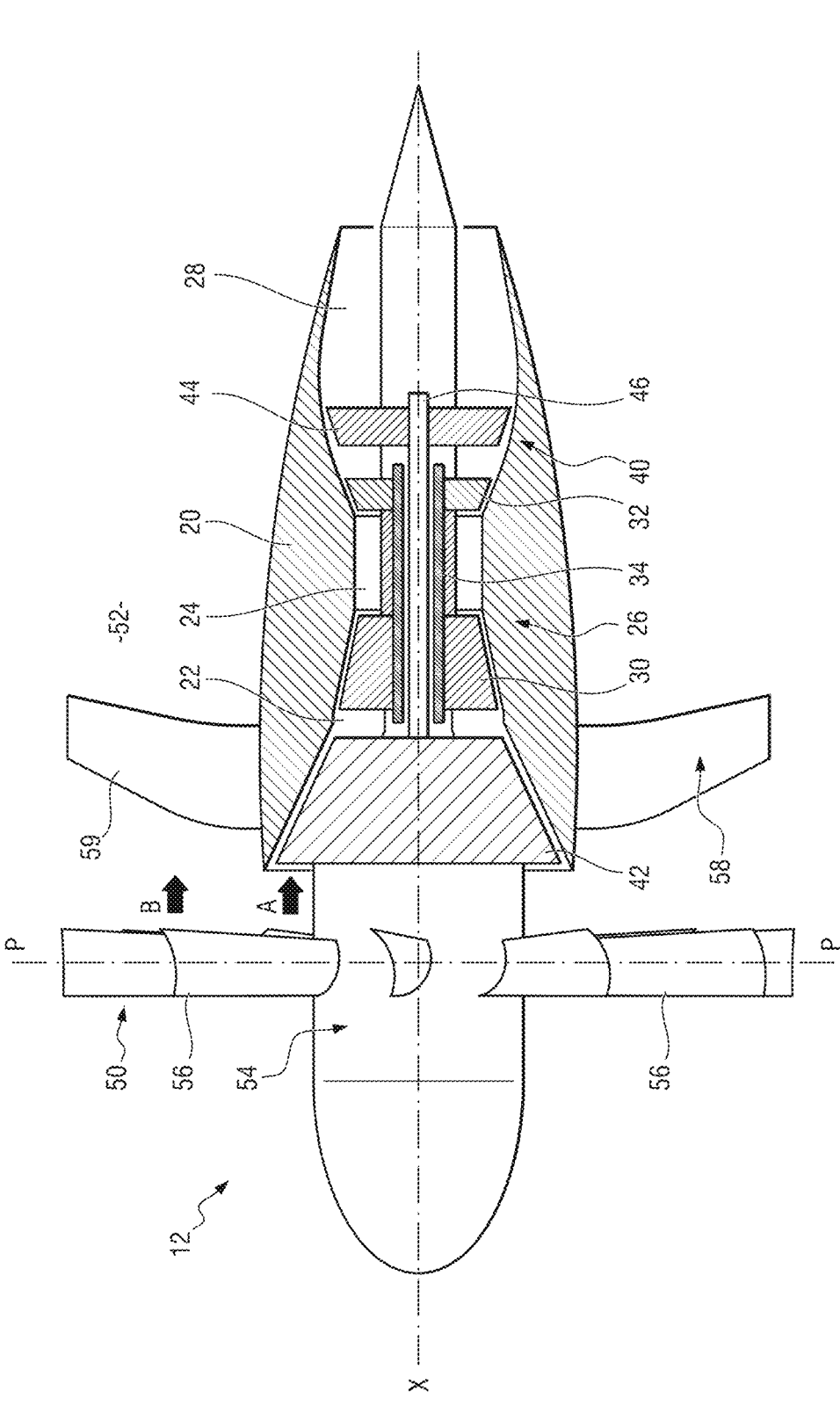
FIG. 2 is a simplified partial longitudinal section view of a turbomachine of the aircraft of FIG. 1.

One of the turbomachines 12 is shown on FIG. 2.

As can be seen in this Figure, the turbomachine 12 is elongated along a longitudinal axis X. It typically has an angular symmetry around said longitudinal axis X, i.e. there is at least one angle for which the turbomachine is rotationally invariant about the longitudinal axis.

Here and in the remainder of the text, the terms "inner" and "outer" and "internal" and "external" are understood with reference to the axis X, an element described as "inner" or "internal" being oriented toward the axis X while an "outer" or "external" element is oriented opposite the axis X.

The turbomachine 12 comprises, conventionally, a nacelle 20, an inner air path 22 for the circulation of a stream of air through the nacelle 20, a combustion chamber 24 housed in the air path 22, an engine spool 26 and a gas exhaust nozzle 28.

In the remainder of the text, the terms "upstream" and "downstream" are understood with reference to a direction of flow of an air stream through the air path 22.

The engine spool 26 comprises a compressor 30, a turbine 32 and a drive shaft 34 linking the turbine 32 with the compressor 30 for the driving of the compressor 30 by the turbine 32. The compressor 30 is disposed upstream of the combustion chamber 24 and supplies the combustion chamber 24 with compressed air. The turbine 32 is disposed downstream of the combustion chamber 24 and receives the exhaust gases leaving the combustion chamber 24.

The drive shaft 34 has as rotational axis the longitudinal axis X.

The drive shaft 34 is rotationally guided with respect to the nacelle 20 by way of bearings (not shown).

In the example shown, the turbomachine 12 is a multi-spool turbomachine, in particular twin-spool, comprising a low-pressure spool 40 in addition to the engine spool 26. The engine spool 26 then constitutes a high-pressure spool, the compressor 30 being a high-pressure compressor, the turbine 32 being a high-pressure turbine and the drive shaft 34 being a high-pressure shaft.

The low-pressure spool 40 comprises a low-pressure compressor 42, a low-pressure turbine 44 and a low-pressure shaft 46 linking the low-pressure turbine 44 to the low-pressure compressor 42 for driving the low-pressure compressor 42 by the low-pressure turbine 44.

The low-pressure compressor 42 is disposed upstream of the high-pressure compressor 30 and supplies the latter with compressed air. The low-pressure turbine 44 is disposed downstream of the high-pressure turbine 32 and receives the exhaust gas leaving the latter.

The low-pressure shaft 46 is rotationally guided with respect to the nacelle 20 by way of bearings (not shown).

The low-pressure shaft 46 is coaxial with the high-pressure shaft 34. It therefore also has as axis of rotation the longitudinal axis X. In particular, the low-pressure shaft 46 extends inside the low-pressure shaft 34.

The turbomachine 12 also comprises a fan 50 to drive the air stream in an outer air flow path 52 surrounding the nacelle 20. One can thus distinguish a primary air stream A (hot), formed by the portion of the air stream driven through the inner air flow path 22, and a secondary air stream B (cold), formed by the portion of the air stream driven through the outer air flow path 52.

The fan 50 comprises a fan rotor 54. This fan rotor 54 is mounted rotatably in relation to the nacelle 20 around the longitudinal axis X by way of a guide bearing 53. It comprises a hub 55 (FIG. 3) provided with fan blades 56 extending substantially radially outward from the hub 55. These blades 56, when they are rotated, drive the air stream through the outer air flow path 52.

Figure 8:
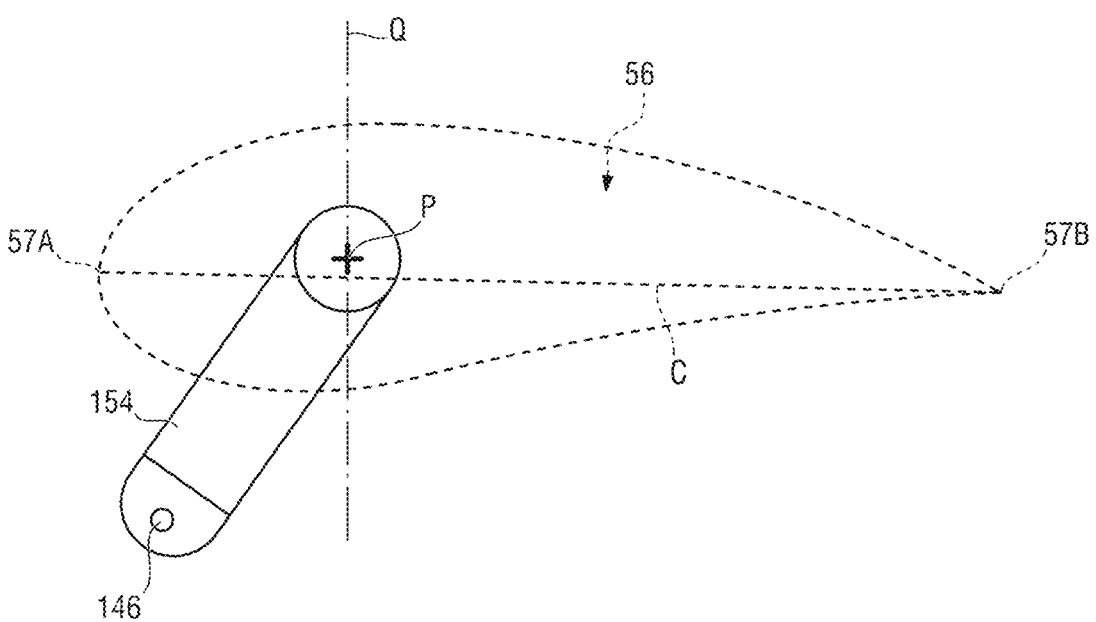
FIG. 8 is a simplified view along a radial axis of an arm for rotating a variable-setting blade of the turbomachine of FIG. 2.

As can be seen on FIG. 8, each blade 56 comprises a leading edge 57A, a trailing edge 57B and a chord C connecting the leading edge 57A to the trailing edge 57B.

Returning to FIG. 2, the fan rotor 54 is rotationally driven by the low-pressure turbine 44, by way of the low-pressure shaft 46. Preferably, this driving is done by way of a reduction gear (not shown) allowing the fan rotor 54 to rotate at a lower speed than that of the low-pressure shaft 46. In a variant (not shown), this driving is direct, i.e. the fan rotor 54 is rotationally secured to the low-pressure shaft 46.

In the example shown, the fan 50 also comprises a fan stator 58 comprising fixed blades 59 arranged on the periphery of the nacelle 20, in the outer air flow path 52, along a plane orthogonal to the longitudinal axis X. This fan stator 58 is here arranged downstream of the fan rotor 54. In a variant (not shown), the fan 50 comprises a contrarotating fan rotor instead of the fan stator 58.

Advantageously, the fan 50 is, as shown, unducted, i.e. the outer air flow path 52 has no peripheral delimitation. The turbomachine 12 then consists, as shown, in a turbojet engine with an unducted fan or, in a variant, in a turboprop engine. In a variant (not shown), the outer air flow path 52 is defined by the nacelle 20 and a fan casing surrounding the fan 50; the turbomachine 12 then typically consists of a turbojet engine with a high bypass ratio, the expansion rate being defined as the ratio of the flow rate of the secondary stream B (cold) to the flow rate of the primary stream A (hot).

In the example shown, the turbomachine 12 is in particular of "puller" type, i.e. the fan 50 is disposed upstream of the inner air flow path 22 and also drives the stream of air in this latter. In a variant (not shown), the turbomachine is of "pusher" type, i.e. the fan 50 is placed around the downstream half of the nacelle 20. The blades 56 of the fan rotor 54 have variable setting, i.e. each blade 56 is mounted pivotably in relation to the hub 55 about a respective pivot axis P. This pivot axis extends along the direction of elongation of the blade 56. It is orthogonal to the longitudinal axis X.

Each blade 56 is in particular able to pivot about the axis P in relation to the hub 55 between a so-called feathered position, in which the chord C of the blade 56 is substantially parallel to the longitudinal axis X, and a so-called flat position, in which the chord C of the blade 56 is substantially orthogonal to the longitudinal axis X. Preferably, each blade 56 is also able to pivot beyond the flat position, all the way into a so-called reverse position, in which the chord C of the blade 56 forms an angle strictly greater than 90°, for example substantially equal to 95°, with the longitudinal axis X. Since the blades 56 are usually twisted, the chord C taken as reference for the measurement of the setting angle is, by convention, formed by the cord of the blade at 75% of the radius of the fan rotor 54.

Figure 3:
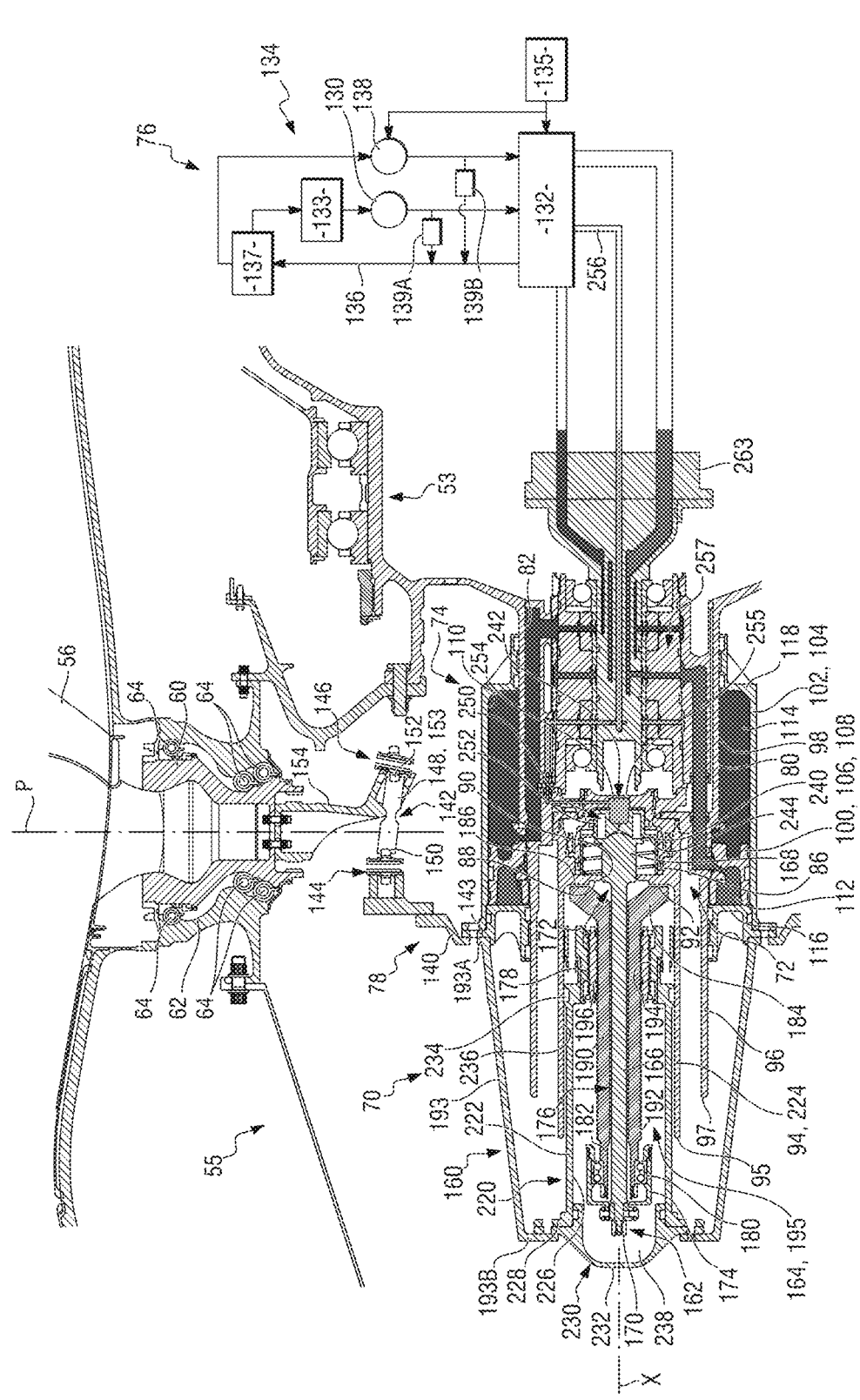
FIG. 3 is a simplified longitudinal section view of a part of a pitch change mechanism of the turbomachine of FIG. 2, according to a first embodiment, the pitch change mechanism being in a first configuration.

For this purpose, each blade 56 is secured, as can be seen on FIG. 3, to a fastening part 60 disposed at the blade root. This fastening part 60 is mounted rotatably with respect to the hub 55 about the pivot axis P. More precisely, the fastening part 60 is mounted rotatably inside a housing 62 fashioned in the hub 55 by way of ball bearings 64 or other rolling elements.

The fan 50 further comprises a pitch change mechanism 70 for adjusting the setting angle of each blade 56 around its pivot axis P so as to adapt the performance of the turbomachine 12 to the different flight phases.

A first embodiment of the pitch change mechanism 70 will now be described, with reference to FIGS. 3 to 9.

With reference to FIG. 3, the pitch change mechanism 70 comprises, in this first embodiment, a frame 72, a control actuator 74, a system 76 for controlling the control actuator 74 and a linking system 78.

The frame 72 is secured to the hub 55 and typically consists of a part of the hub 55. It is thus fixed in relation to the pivot axes P.

The frame 72 comprises a base 80. This base 80 is centered on the longitudinal axis X. Here, it is traversed by the pivot axes P.

In the example shown, the base 80 delimits a housing 82 open in the downstream direction. This housing 82 is in particular a cylinder of revolution, and centered on the axis X.

Returning to FIG. 3, the base 80 also delimits a cavity 86 opening onto an upstream face 88 of the base 80 through an orifice 90 which is here centered on the axis X. This cavity 86 is in particular cylindrical, typically a cylinder of revolution, and centered on the axis X. It is interposed between the upstream face 88 and the housing 82.

The base 80 has a stop block 92 oriented downstream. This stop block 92 is here formed by a part of the upstream face 88. It extends substantially radially and is in particular arranged around the orifice 90.

In the example shown, the frame 72 also comprises a cylinder 94 projecting upstream from the base 80. This cylinder 94 is centered on the axis X and open to its upstream end 95. It extends around the stop block 92. It is typically a cylinder of revolution.

Here, the frame 72 further comprises a peripheral cylinder 96, coaxial with the cylinder 94 and surrounding this latter, projecting upstream from the base 80. This cylinder 96 is open to its upstream end 97. It is typically a cylinder of revolution.

The base 80 and the peripheral cylinder 96 together delimit an outer peripheral surface 88 of the frame 72. This outer peripheral surface 88 is substantially cylindrical and centered on the axis X. It is oriented radially outward.

Figure 5:
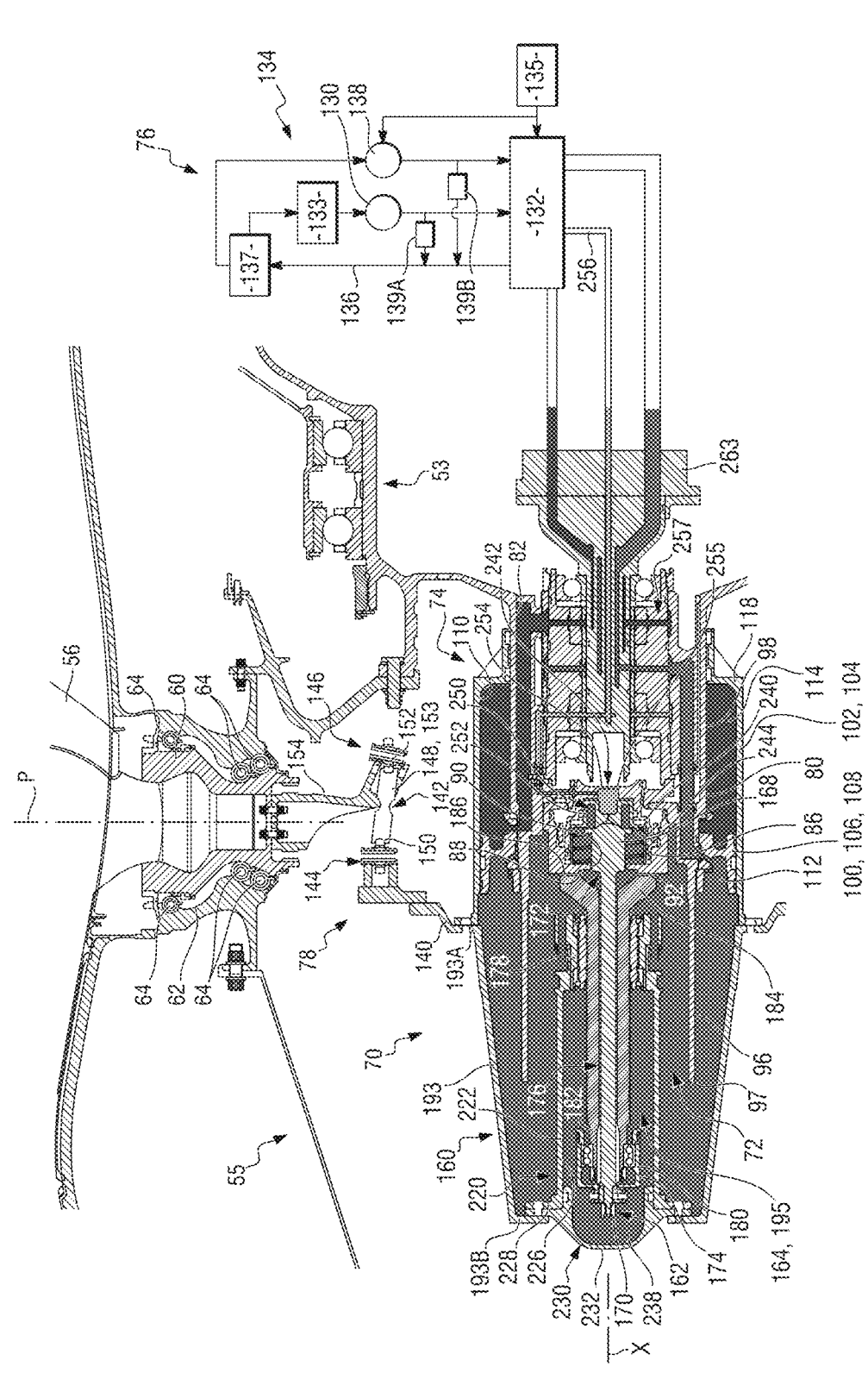
FIG. 5 is a similar view to that of FIG. 3 of a first variant of the pitch change mechanism of FIG. 3.

In a variant, as shown on FIG. 5, the frame 72 does not comprise the cylinder 94.

Figure 6:
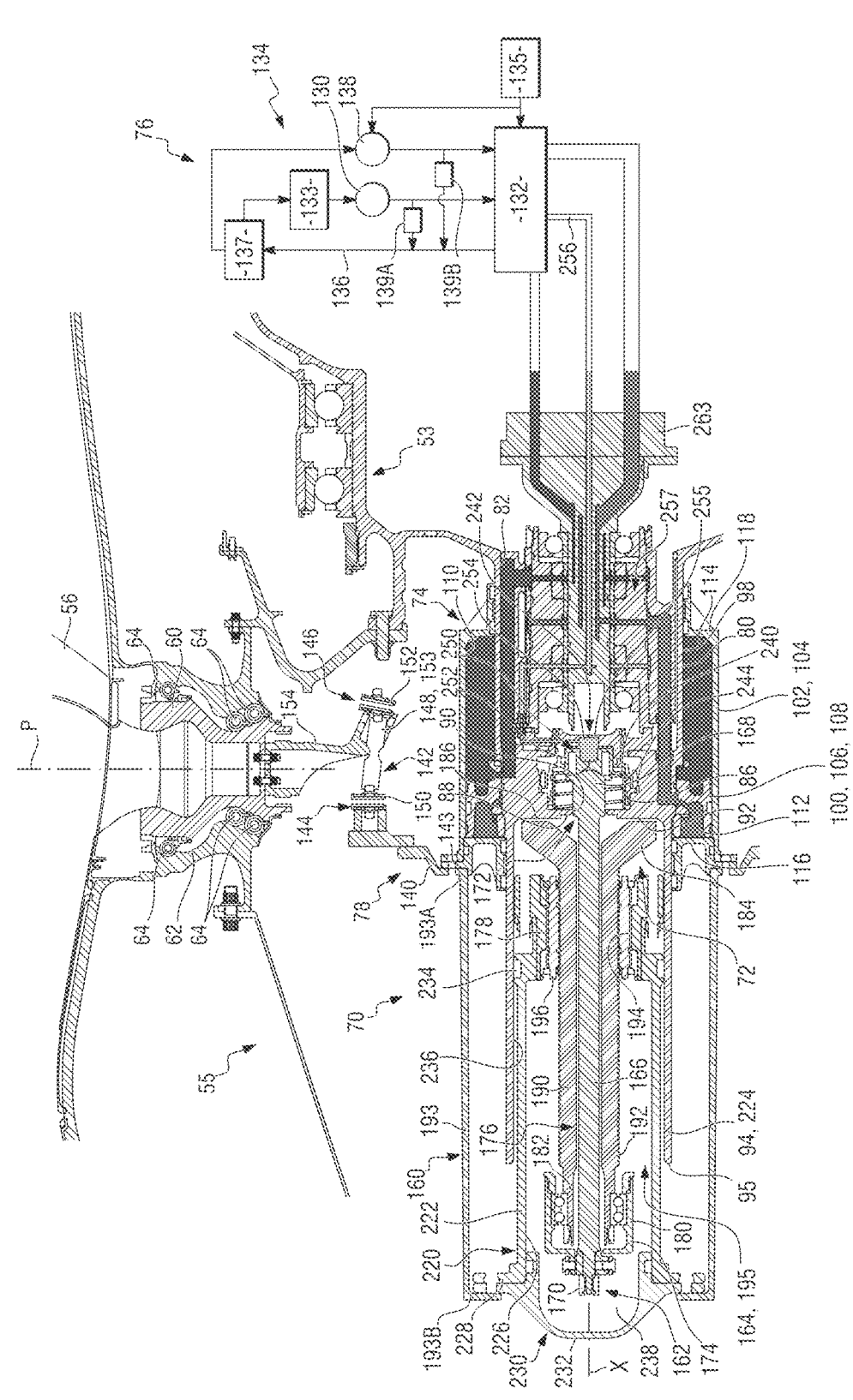
FIG. 6 is a similar view to that of FIG. 3 of a second variant of the pitch change mechanism of FIG. 3.

In a further variant, as shown on FIG. 6, the frame 72 does not comprise the peripheral cylinder 96. The outer peripheral surface 88 is then delimited by the base 80 and the cylinder 94.

Figure 4:
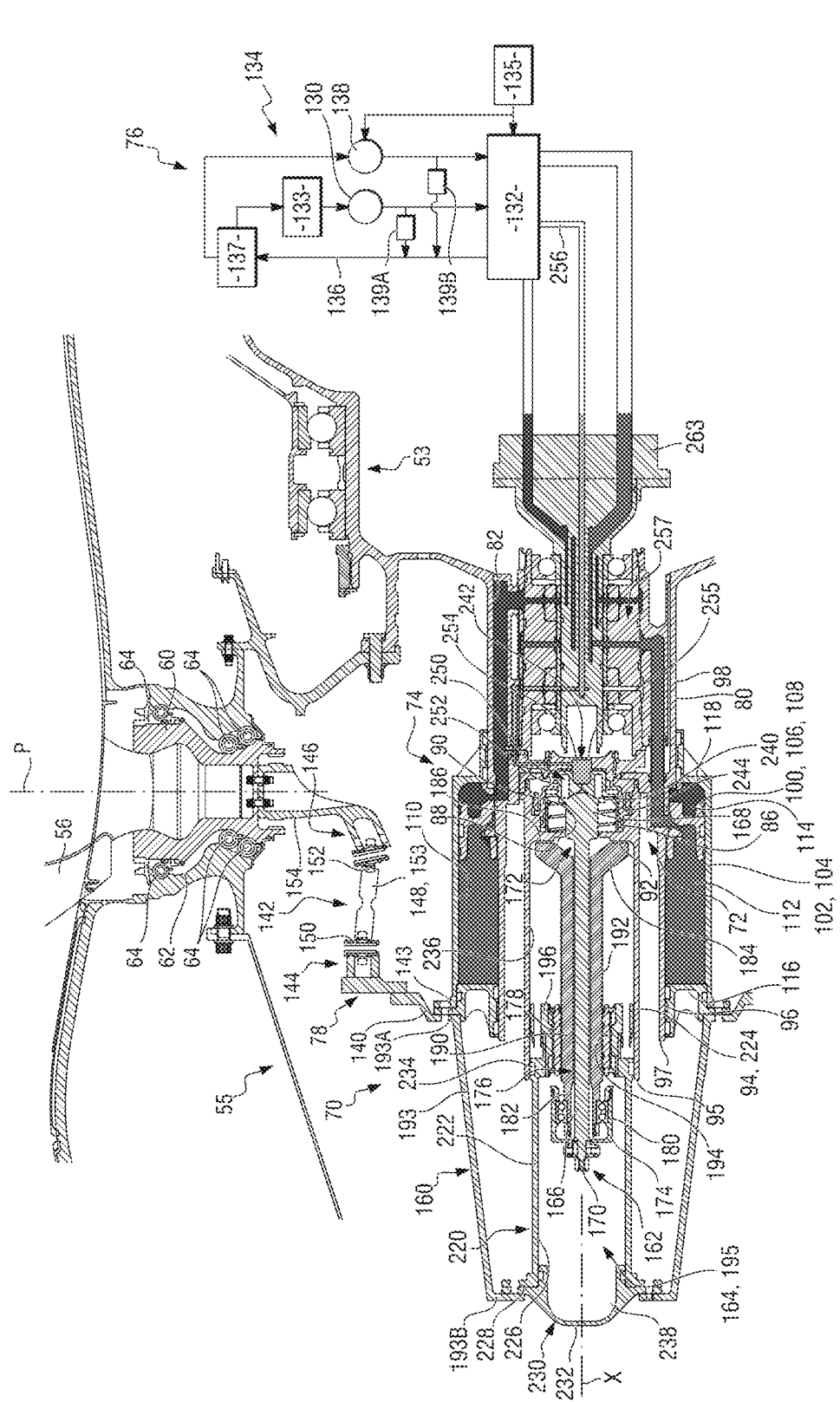
FIG. 4 is a view similar to that of FIG. 3, the pitch change mechanism being in a second configuration.

Returning to FIG. 3, the control actuator 74 includes a fixed part 100, secured to the frame 72, and a movable part 102 translationally movable along the longitudinal axis X in relation to the fixed part 100 between a retracted position, shown on FIG. 3, and an extended position shown on FIG. 4. Optionally, the movable part 102 is also rotationally movable about the longitudinal axis X over a restricted angle, for example in the order of 5°.

The control actuator 74 is moreover substantially centered on the longitudinal axis X. The control actuator 74 therefore has as axis the longitudinal axis X.

The control actuator 74 in particular comprises a cylinder 104, continuous, forming one of the fixed part 100 and the movable part 102 and a piston 106 forming the other of the fixed part 100 and the movable part 102. Here, the cylinder 104 forms the movable part 102 and the piston 106 forms the fixed part 100.

Thus, in the example shown, the cylinder 104 extends around the outer peripheral surface 88 of the frame 72, coaxially with this latter, and the piston 106 consists of a collar 108 secured to the frame 72 extending radially outward from the outer peripheral surface 88 all the way to the cylinder 104.

The cylinder 104 delimits an inner cavity 110. The piston 106 divides said inner cavity 110 into two contiguous fluid chambers 112, 114. Each one contains a actuating fluid, typically consisting of oil, for actuating the displacement of the movable part 102 in relation to the fixed part 100. This actuating fluid is at a first pressure in the first fluid chamber 112 and at a second pressure in the second fluid chamber 114. The first and second fluid chambers 112, 114 are arranged such that the relative increase of the first pressure (i.e. in relation to the second pressure) drives the displacement of the piston 110 toward its extended position, the relative increase of the second pressure (i.e. in relation to the first pressure) driving the displacement of the piston 110 toward its retracted position.

Here, each of the fluid chambers 112, 114 is delimited internally by the outer peripheral surface 88 of the frame 72 and externally by the cylinder 104. The first fluid chamber 112 is moreover delimited at its downstream end by the piston 106 and the second fluid chamber 114 is delimited at its upstream end by the piston 106.

The control actuator 74 is also particularly compact, which makes it possible to make it lighter.

In the example shown on FIG. 3, the movable part 102 also comprises an upstream guiding bush 116 and a downstream guiding bush 118 each secured to the cylinder 104 and extending radially inward from the cylinder 104 all the way to the outer peripheral face 88 of the frame 72. The upstream guiding bush 116 is disposed upstream of the piston 106 and delimits an upstream end of the first fluid chamber 112. The downstream guiding bush 118 is disposed downstream of the piston 106 and delimits a downstream end of the second fluid chamber 114.

In the example shown on FIG. 3, each of the upstream and downstream guiding bushes 116, 118 constitutes a sealing bush and longitudinally closes the first fluid chamber 112 and the second fluid chamber 114 respectively. The fluid chambers 112, 114 are thus closed at each of the longitudinal ends of the control actuator 74.

Figure 7:
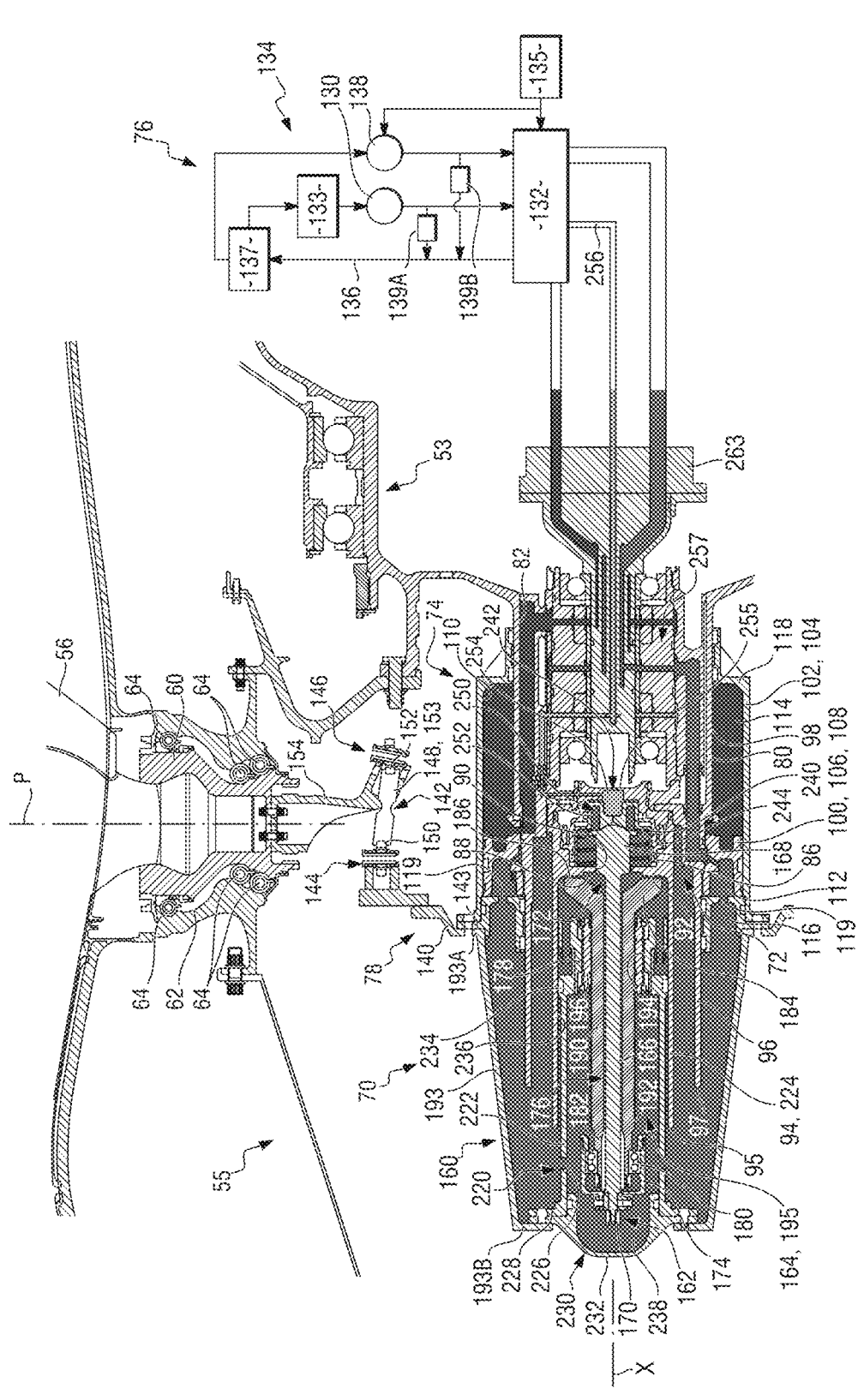
FIG. 7 is a similar view to that of FIG. 3 of a third variant of the pitch change mechanism of FIG. 3.

In a variant, as shown on FIG. 7, only the downstream guiding bush 118 constitutes a sealing bush. The upstream guiding bush 118 itself has drill holes 119 allowing the actuating fluid to flow through the upstream guiding bush 118.

In another variant, as shown on FIG. 5, the movable part 102 does not comprise any upstream guiding bush 118.

Returning to FIG. 3, the control system 76 comprises a pressure generator 130 to bring the actuating fluid to a third pressure higher than the first and second pressures, a pressure control unit 132 to adjust the pressure of the actuating fluid in the first and second fluid chambers 112, 114 by means of the third pressure, and a return line 136 to expel the depressurized actuating fluid. The control system 76 also comprises a main reservoir 133, an emergency circuit 134 and a command module 135.

The pressure generator 130 for example comprises a pump able to pump the fluid to bring it to the third pressure, for example 100 bars. A main overpressure valve 139A makes it possible to expel a part of the actuating fluid to the return line 136 when the pressure of the actuating fluid downstream of the pressure generator 130 exceeds the third pressure.

The pressure control unit 132 is supplied with actuating fluid at the third pressure by the pressure generator 130. It is fluidly connected to the first fluid chamber 112 and to the second fluid chamber 114. It is able to distribute the actuating fluid between the first fluid chamber 112 and the second fluid chamber 114 in such a way as to adjust the fluid pressure inside each of these chambers 112, 114 and, thus, adjust the position of the piston 110 between its retracted and extended positions. It is also able to expel actuating fluid coming from the first and second fluid chambers 112, 114 into the return line 136.

The main reservoir 133 is configured to collect depressurized actuating fluid coming from the return line 136. It supplies the pressure generator 130.

The emergency circuit 134 is able to supply the first fluid chamber 112 with actuating fluid in such a way as to displace the piston 110 toward its extended position in the event of a malfunction in the pressure generator 130. For this purpose, the emergency circuit 134 comprises an auxiliary reservoir 137 and an auxiliary pump 138. In the example shown it also comprises an auxiliary overpressure valve 139B.

The auxiliary reservoir 137 is configured to collect depressurized actuating fluid coming from the return line 136. It supplies the auxiliary pump 138. In the example shown, it also supplies the main reservoir 133, the depressurized actuating fluid coming from the return line 136 being transported via the auxiliary reservoir 137 before reaching the main reservoir 133.

The auxiliary pump 138 is able to pump the actuating fluid into the auxiliary reservoir 137 to bring it to the third pressure. It is fluidly connected with the pressure control unit 132 in such a way as to supply it with actuating fluid at the third pressure, the pressure control unit 132 being configured to redirect the entirety of the actuating fluid coming from the auxiliary pump 138 to the first fluid chamber 112.

The overpressure valve 139B is able to expel a part of the actuating fluid to the return line 136 when the pressure of the actuating fluid downstream of the auxiliary pump 138 exceeds the third pressure.

The command module 135 is configured to receive a setting instruction (not shown) and to deduce therefrom a command signal transmitted to the pressure control unit 132. In particular, the command module 135 is configured to transmit to the pressure control unit 132 a command signal intended to increase the fluid pressure in the first chamber 112 when the setting instruction has the aim of increasing the pitch of the blades 56, and to transmit to the pressure control unit 132 a command signal intended to increase the fluid pressure in the second chamber 114 when the setting instruction has the aim of reducing the pitch of the blades 56.

The command module 135 is also configured to transmit to the emergency circuit 134, more specifically to its auxiliary pump 138, an instruction to start in the event of a malfunction of the pressure generator 130.

The control system 76 is fixed in the reference frame attached to the nacelle 20. Thus, the control actuator 74 is rotationally movable about the longitudinal axis X in relation to said control system 76.

The linking system 78 links the movable part 102 to each blade 56 so as to convert the translation of the movable part 102 along the longitudinal axis X and, where applicable, the rotation of the movable part 102 about the longitudinal axis X into a rotation of each blade 56 about its pivot axis P. In particular, the linking system 78 links the movable part 102 to each blade 56 so as to convert:

the translation of the movable part 102 along the longitudinal axis X in a first direction into a rotation of the variable-setting blade 56 about the pivot axis P into the flat position, and the translation of the movable part 102 along the longitudinal axis X in a second direction opposed to the first direction into a rotation of the variable-setting blade 56 about the pivot axis P into the feathered position.

For this purpose, the linking system 78 comprises a synchronization ring 140 secured to the movable part 102 and, for each of the blades 56, a mechanism 142 for linking the blade 56 to the synchronization ring 140.

The synchronization ring 140 extends in a radial plane around the movable part 102. It is in particular attached to an upstream end 143 of the movable part 102.

Each linking mechanism 142 comprises a first articulation 144 secured to the movable part 102, a second articulation 146 secured to the blade 56, away from the pivot axis P of said blade 56, and a linking member 148 linking the first articulation 144 to the second articulation 146.

The first articulation 144 is carried by the synchronization ring 140. Here it is formed by a ball joint.

The second articulation 146 is also formed by a ball joint. Here it is off-center in relation to the pivot axis P.

The linking member 148 has a first end 150 articulated with the first articulation 144 and a second end 152 articulated with the second articulation 146. Advantageously the linking member 148 is rigid and of adjustable length, i.e. the distance between the first and second ends 150, 152 can be modified, which makes it possible to precisely adjust the length of it when stopped so as to allow the control of the setting angle of each blade 56 by the pitch change mechanism 70.

The linking member 148 here consists of a rod 153.

In the example shown, each linking mechanism 142 also comprises a crank 154 connecting the fastening part 60 to the second articulation 146. This crank 154 is rigid and secured to the fastening part 60. It extends at least in part along a direction orthogonal to the pivot axis P. It forms an arm for rotating the blade 56.

In the example shown on FIG. 3, the first direction goes from upstream to downstream, i.e. the displacement of the movable member 102 toward the stop block 92 (in other words toward its retracted position) drives a rotation of each blade 56 toward its flat position, and the second direction goes from downstream to upstream, i.e. the displacement of the movable member 102 away from the stop block 92 (in other words toward its extended position) drives a rotation of each blade 56 toward its feathered position. In addition, the first articulation 144 is disposed upstream of the second articulation 146.

For this purpose, the second articulation 146 is, as can be seen on FIG. 8, placed opposite the trailing edge 57B in relation to a plane Q orthogonal to the chord C and containing the pivot axis P.

This particular arrangement makes it possible, when the pitch change mechanism 70 is immobilized, for the natural stressing of the blade 56 toward its flat position to make the linking member 148 work under traction and not under compression. The risk of buckling of the linking member 148 is therefore very low, so that it is possible to use a linking member 148 with relatively little resistance and thus to lighten the pitch change mechanism 70.

The pitch change mechanism 70 further comprises a pitch locking device 160 suitable for locking the translation of the movable part 102 of the control actuator 74 in the first direction, i.e. here toward its retracted position.

This locking device 160 comprises a support member 162 and a screw-and-nut system 164.

The support member 162 is translationally movable in relation to the frame 72 along the longitudinal axis X between an operating position, shown on FIGS. 3 to 7, and a locking position (not shown). The support member 162 is displaced from its operating position to its locking position by translation in the first direction, i.e. in the example shown on FIG. 3, by translation from upstream to downstream. In other words, the operating position of the support member 162 is disposed upstream of its locking position.

The support member 162 comprises a body 166 elongated along the longitudinal axis X and centered on the longitudinal axis X. Said body 166 has a first longitudinal end 168, in particular a downstream longitudinal end, engaged through the orifice 90 of the frame 72, and a free second longitudinal end 170. Here the body 166 is solid.

The first longitudinal end 168 and the orifice 90 of the frame 72 together form a guiding system 172 guiding the support member 162 in relation to the frame 72. This guiding system 172 is here disposed on a downstream side of the screw-and-nut system 164.

The support member 162 also comprises a skirt 174 secured to the body 166 and arranged around the second longitudinal end 170 of the body 166.

The screw-and-nut system 164 comprises a screw 176 and a nut 178.

The screw 176 extends around the body 166 of the support member 162 and is coaxial with said body 166. It is secured in translation to the support member 162 and mounted rotationally movable about the longitudinal axis X in relation to the support member 162. For this purpose, the screw 176 is assembled on the support member 162 by way of a bearing 180. This bearing 180 is here interposed between the skirt 174 of the support member 162 and an end portion 182 of the screw 176, housed between the body 166 and the skirt 174.

The screw 176 has a second longitudinal end portion 184 opposite the end portion 182. This second longitudinal end portion 184 defines a radial stop surface 186. This stop surface 186 is distant from the frame 72 when the support member 162 is in the operating position and bearing against the stop block 92 of the frame 72 when the support member 162 is in the locking position.

Here, the second longitudinal end portion 184 flares from a threaded body 190 of the screw 176 all the way to the stop surface 186. Thus, the contact surface between the stop surface 186 and the stop block 92 is increased, which increases the friction forces between the stop surface 186 and the stop block 92 and allows a better transmission of the braking and locking efforts.

The stop surface 186 and the stop block 92 are each smooth here. In a variant (not shown), the stop surface 186 and/or the stop block 92 has or have asperities, in such a way as to yet further increase the friction forces between the stop surface 186 and the stop block 92 and allow an even greater transmission of the efforts.

The stop surface 186 extends in particular substantially radially. It is oriented in the first direction, i.e. in the example shown on FIG. 3, downstream. Here, it is fashioned at a downstream end of the screw 176.

The threaded body 190 extends from one of the end portions 182, 184 to the other. It has an outer threading 192 on its circumference.

The threaded body 190 and the nut 178 are housed inside the cylinder 94 of the frame 72.

The nut 178 is secured to the movable part 102 of the control actuator 74 and coaxial with the screw 176. It interacts with the screw 176 such that a translation of the nut 178 along the longitudinal axis X in relation to the screw 176 drives the rotation of the screw 176 about the longitudinal axis X in relation to the support member 162.

The nut 178 has an inner tapping 194.

The screw-and-nut system 164 is in particular formed by a reversible planetary roller screw system 195. Conventionally, this planetary roller screw system 195 comprises, besides the screw 176 and the nut 178, a plurality of rollers 196 interposed between the screw 176 and the nut 178, each roller 196 being elongated parallel to the longitudinal axis X.

Figure 9:
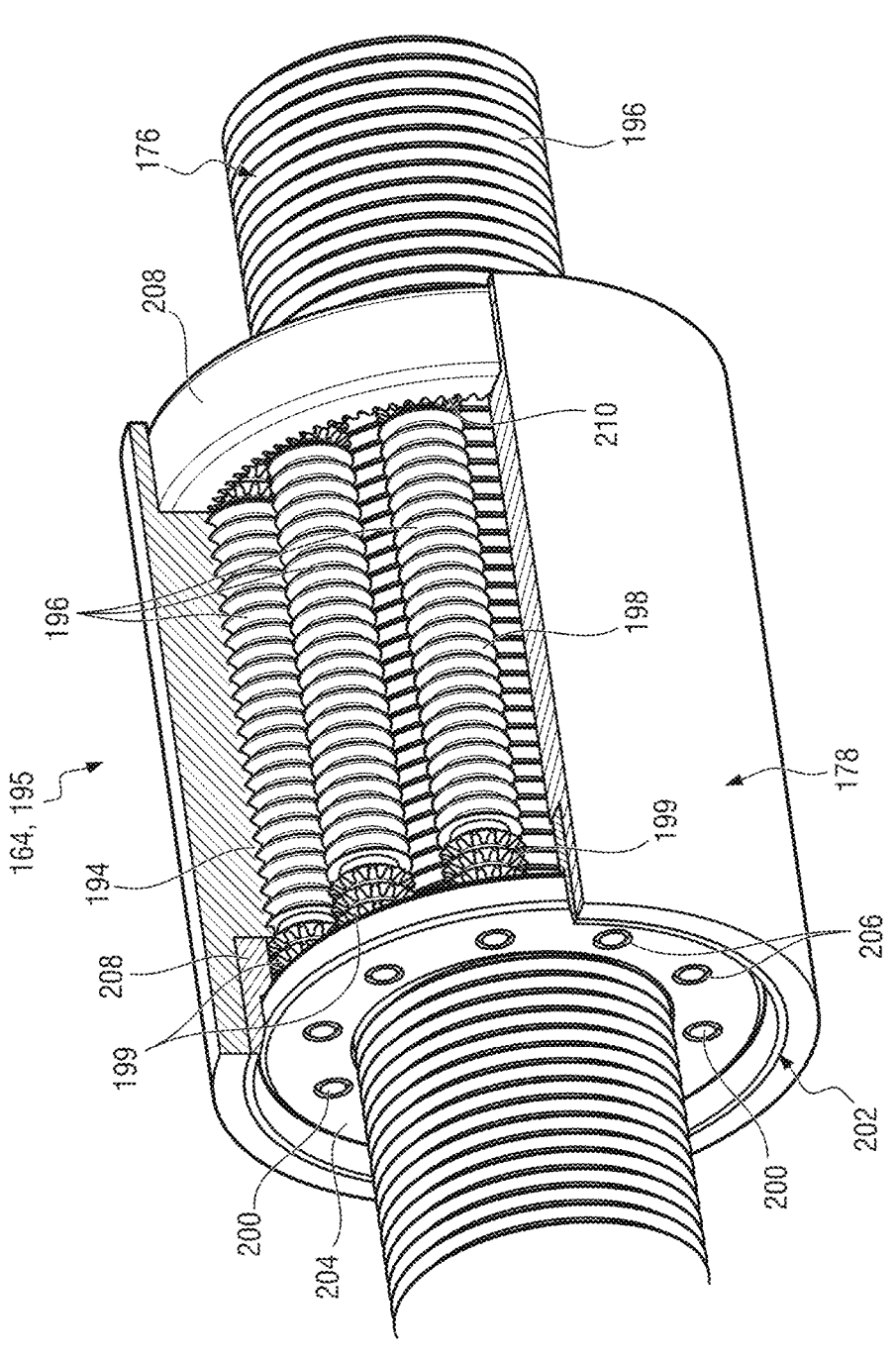
FIG. 9 is a perspective and partial section view of a planetary roller screw of the pitch change mechanism of FIG. 3.

As can be seen on FIG. 9, each roller 196 has a thread 198 in engagement with the outer threading 192 of the screw 176 and the inner tapping 194 of the nut 176. It further comprises an outer toothing 199 located at its ends and extended by journals 200.

The planetary roller screw system 195 also has, still conventionally, a device 202 for guiding and retaining the rollers 196. This guiding and retaining device 202 comprises roller carriers 204 (also known as spacer rings) which are mounted coaxially with the screw 176, between this screw and the nut 178, with notches 206 receiving the journals 200 of the rollers 196. It also comprises a synchronization toothing 210 in which the outer toothings 198 located at the respective ends of the rollers 196 mesh. This meshing of the outer toothings 198 in the synchronization toothing 210 forms a planetary gear, the role of which is to ensure a synchronization of the planetary movement, also known as epicyclic, of the rollers 196, thus streamlining the motion of the rollers 196 by helping them to roll easily, with as little slip as possible, over the threading 192 of the screw 176 and the tapping 194 of the nut 178.

In the example shown, the planetary roller screw system 195 is of standard type, the rollers 196 being translationally secured to the nut 178. The synchronization toothing 210 consists of the inner toothing of the rings 208 secured to the nut 178 and respectively mounted at each longitudinal end of the nut 178, this latter having a longitudinal extension substantially equal to that of the threaded portion of the rollers 196 and less than that of the threaded body 190 of the screw 176.

In a variant (not shown), the planetary roller screw system 195 is of inverted type, the rollers 196 being translationally secured to the screw 176. The synchronization toothing 210 then consists of two outer toothings of the screw 176 at each longitudinal end of the threaded body 190, this latter having a longitudinal end substantially equal to that of the threaded portion of the rollers 196 and less than that of the nut 178.

As another variant, the planetary roller screw system 195 consists of a recirculating roller screw system such as for example that described in the document EP 275 504 A2, or by a roller bearing screw system such as for example that described in the document EP 168 942 A1 or that described in the document EP 671 070 A1.

This feature allows a good transmission of the efforts of the nut 178 to the screw 176 by the screw-and-nut system 164, while keeping a small pitch in the helical linkage of the screw-and-nut system 164. In particular, in the event of locking of the rotation of the screw 176, it makes it possible to immobilize the nut 178 in relation to the screw 176 even in the absence of a separate locking nut. It is thus possible to dispense with the use of a separate locking nut, which simplifies the manufacturing and reduces the costs of the mechanism, while increasing its reliability and minimizing its mass.

In a variant (not shown), the screw-and-nut system 164 consists of a screw-and-nut system similar to that described in EP 1 832 509.

Returning to FIG. 3, the pitch locking device 160 is, in the example shown on this Figure, outside the fluid chambers 112, 114 of the control actuator 74. This arrangement makes it possible to assemble the pitch locking device 160 and the control actuator 74 separately from one another on the frame 72, which facilitates the installation of the pitch change mechanism 70 and thus reduces the cost.

As can be seen on FIG. 3, a part of the pitch locking device 160 extends even longitudinally away from the control actuator 74. In other words, there exists a radial plane beyond which a part of the pitch locking device 160 extends without the control actuator 74 extending beyond said radial plane. In particular, said part of the pitch locking device 160 extends upstream of the control actuator 74.

To allow this arrangement, the pitch locking device 160 comprises a ferrule 193 connecting the nut 178 to the movable part 102 of the control actuator 74. This ferrule 193 here projects longitudinally upstream from the control actuator 74. It is in particular frustoconical, its diameter decreasing from its downstream end 193A, attached to the control actuator 74, all the way to its upstream end 193B, attached to the nut 178.

In the example shown on FIG. 3, the pitch locking device 160 is also longitudinally cantilevered in relation to the frame 72. In other words, the entire part of the frame 72 supporting the locking device 160 is located longitudinally on one and the same side, here downstream, of the locking device 160; the locking device 160 is not longitudinally framed by the part of the frame 72 supporting it. This arrangement saves the use of a support disposed upstream of the locking device 160, which facilitates access to the pitch change mechanism 70 and especially to the linking system 78.

Thus, the control actuator 74 is, in the example shown on FIG. 3, disposed longitudinally on the same side of the nut 178, here the downstream side, as the guiding device 172 and the stop block 92.

To provide good support of the locking device 160 despite this cantilever, the pitch change mechanism 70 comprises a device 220 for guiding the nut 178 in relation to the frame 72. This guiding device 220 includes an inner cylinder 222 secured to the nut 178 and an outer cylinder 224 secured to the frame 72, the inner cylinder 222 interacting with the outer cylinder 224 in such a way as to slide longitudinally inside this latter.

The nut 178 is in particular mounted on an inner face 226 of the inner cylinder 222. The inner cylinder 222 has an upstream end 228 to which the upstream end 193B of the ferrule 193 is attached.

The outer cylinder 224 here consists of the cylinder 94 of the frame 72.

The pitch locking device 160 requires lubrification. For this purpose, the locking device 160 comprises a casing 230 at least partially delimiting an enclosure for the circulation of a lubrication fluid for the pitch locking device 160. This casing 230 is secured to the nut 178 and surrounds the nut 178, the screw 176 and the support member 162.

In the examples of FIGS. 3, 4 and 6, the casing 230 comprises the inner cylinder 222 and a cap 232 closing one end of the inner cylinder 222 opposite the frame 72, here the upstream end 228. The inner cylinder 222 has at its periphery a seal 234 in contact with an inner face 236 of the outer cylinder 224. Thus, the outer cylinder 224 and the casing 230 together delimit an enclosure 238 for the circulation of a lubrication fluid for the locking device 160. This enclosure 238 is fluidly isolated from the fluid chambers 112, 114 of the control actuator 74 by the seal 234 and the upstream guiding bush 116. The seal 234 and the guiding bush 116 thus form seals of the pitch change mechanism 70 fluidly isolating the fluid chambers 112, 114 of the control actuator 74 from the pitch locking device 160.

Advantageously, the lubrication fluid of the locking device 160 consists of an oil. The pitch locking device 160 then comprises an accumulator (not shown) allowing the storage of the lubrication fluid when the control actuator 74 is in the retracted position and the transfer of the lubrication fluid into the enclosure 238 when the control actuator 74 is displaced toward its extended position. As a variant, the lubrication fluid of the locking device 160 consists of a grease deposited on the screw 176 and the balls of the bearing 180.

In the example of FIG. 5, in which the outer cylinder 224 and the upstream guiding bush 116 are absent, as well as in FIG. 7, where the inner cylinder 222 and the upstream guiding bush 116 are drilled, the casing 230 consists of the ferrule 193 and of a cap 239 closing the upstream end 193B of the ferrule 193. The first fluid chamber 112 is then in fluid communication with the inside of the casing 230, the actuating fluid forming the lubrication fluid of the locking device 160.

This variant makes it possible to dispense with the use of an accumulator. It does however require a pump 130 with a higher flow rate than in the variant of FIGS. 3, 4 and 6.

The locking device 160 also comprises a biasing device 240 biasing the support member 162 into its locking position and a retaining device 242 to retain the support member 162 in its operating position when the pitch change mechanism 70 is under normal operating conditions.

The biasing device 240 here consists of a compression spring compressed between the frame 72 and a shoulder 244 secured to the support member 162. It is in particular housed in the cavity 86, between the shoulder 244 and the orifice 90.

The retaining device 242 comprises a counterbalance actuator 250 including a counterbalance piston 252 and a counterbalance chamber 254.

The counterbalance piston 252 is mounted translationally movable along the longitudinal axis X in relation to the frame 72. It is in particular coaxial with the support member 162. In the example shown, it is arranged in the longitudinal extension of the support member 162, between the support member 162 and the counterbalance chamber 254.

The counterbalance chamber 254 is delimited between the counterbalance piston 252 and the frame 72. In particular, the counterbalance chamber 254 is delimited between the counterbalance piston 252 and a bottom 255 of the cavity 86 opposite the orifice 90; the guiding system 172, the biasing device 240 and the retaining device 242 are thus all disposed longitudinally on one and the same side, here the downstream side, of the screw-and-nut system 164 and therefore in particular of the nut 178.

The counterbalance chamber 254 is fluidly connected to the pressure generator 130 by a fluid connection circuit 256 so as to be supplied with actuating fluid at the third pressure. It is intended to counterbalance the biasing of the biasing device 240 when this supply is active.

For this purpose, the counterbalance actuator 250 is arranged so that the pressure exerted on the piston 252 by the fluid contained in the chamber 254 are oriented in a direction opposing that of the biasing of the biasing device 240: in the example shown, the counterbalance piston 252 is interposed between the chamber 254 and the shoulder 244 and the shoulder 244 is interposed between the piston 252 and the biasing device 240. In addition, the counterbalance piston 252 and the counterbalance chamber 254 are dimensioned so that, when the chamber 254 is supplied when actuating fluid at the third pression, the force exerted by the actuating fluid on the piston 252 is greater than the biasing on the biasing device 240.

Thus, when the supply to the chamber 254 of actuating fluid at the third pressure is active, the biasing of the biasing device 240 is canceled and the support member 162 is retained in the operating position.

In the example shown, the pressure control unit 132 is fluidly interposed between the pressure generator 130 and the fluid connection circuit 256. It has a first configuration, in which it isolates the fluid connection circuit 256 from the return line 136, and a second configuration, in which it fluidly connects the fluid connection circuit 256 to the return line 136.

The pressure control unit 132 is configured to be normally in its first configuration and to switch to its second configuration on receipt of a command instruction transmitted by the command module 135.

Still with reference to FIG. 3, the pitch change mechanism 70 finally comprises a fluid transfer bearing 257 intended to supply the control actuator 74 with actuating fluid coming from the control system 76.

For this purpose, the fluid transfer bearing 257 is configured to transfer the actuating fluid coming from the fixed reference frame attached to the nacelle 20 to the rotary reference frame attached to the fan rotor 54 and more specifically to the first and second chambers 112, 114 of the control actuator 74.

Figure 10:
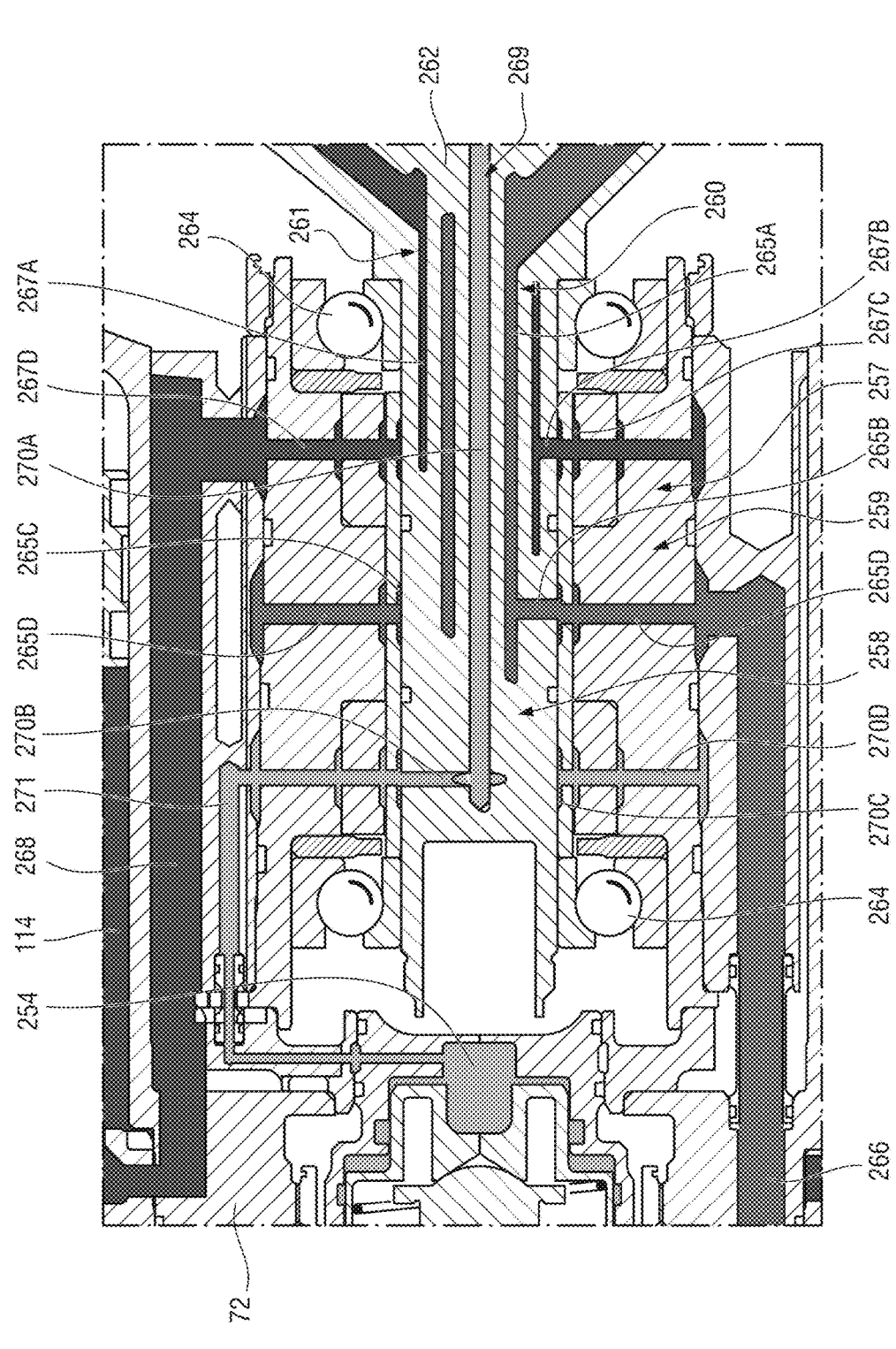
FIG. 10 is a detail view of a fluid transfer bearing of the pitch change mechanism of FIG. 3.

To do this, the fluid transfer bearing 257 comprises, with reference to FIG. 10, a stator 258 which is fixed with respect to the nacelle 20 and a rotor 259 which is movable jointly with the fan rotor 54 (and therefore with the control actuator 74) around the longitudinal axis X in relation to the stator 258. It also comprises a first circuit 260 fluidly connected to the first fluid chamber 112 for the supply of said first fluid chamber 112 with actuating fluid supplied by the control system 76 and a second circuit 261 fluidly connected to the second fluid chamber 114 for supplying said second fluid chamber 114 with actuating fluid provided by the control system 76.

The stator 258 is in the shape of a cylinder of revolution, in particular in the form of a solid cylinder, coaxial with the longitudinal axis X. It is linked by its downstream end 262 to a structure 263 (FIG. 3) of the nacelle 20.

The rotor 259 is in the shape of a cylinder of revolution coaxial with the longitudinal axis X. It extends around the stator 258. Its periphery is in contact with the frame 72. It is rotationally guided around the axis X with respect to the stator 258 by way of bearings 264 interposed between the rotor 259 and the stator 258.

The fluid transfer bearing 257 is thus coaxial with the axis X. It is therefore also coaxial with the control actuator 74.

The first circuit 260 comprises a first axial duct 265A fashioned in the stator 258, a plurality of first radial orifices 265B (only one of them being shown here) fashioned in the stator 258 and connecting the axial duct 265A to the periphery of the stator 258, a first circumferential groove 265C fashioned between the rotor 259 and the stator 258 and into which each radial orifice 265B opens, and a plurality of first radial ducts 265D, fashioned in the rotor 259, extending radially form the groove 265C all the way to a first supply channel 266 of the first fluid chamber 112 formed in the frame 72.

The first axial duct 265A has an axial direction parallel to the axis X. In the example shown, it is in particular straight and coaxial with the axis X. In a variant (not shown) the first axial duct 265A is curved and/or also has a radial extension along a direction orthogonal to the axis X.

Moreover, the first axial duct 265A a, in the example shown, an annular radial section, i.e. it is solid at its center.

Each first radial orifice 265B has a radial extension along a radial direction orthogonal to the axis X. In the example shown, each first radial orifice 265B is in particular straight along a radial direction. In a variant (not shown), at least a first radial orifice 265B is curved and/or also has an axial extension parallel to the axis X.

The first circumferential groove 265C extends parallel to a radial plane orthogonal to the axis X.

Each first radial duct 265D has a radial extension along a radial direction orthogonal to the axis X. In the example shown, each first radial duct 265D is in particular straight along a radial direction. In a variant (not shown), at least a first radial duct 265D is curved and also has an axial extension parallel to the axis X and/or a circumferential extension along a direction orthogonal to the axis X and to the radial direction.

The first supply channel 266 extends from an outlet of the first radial ducts 265D all the way to an inlet of the first fluid chamber 112. In the example shown, it is substantially straight and extends substantially parallel to the axis X.

The second circuit 261 comprises a second axial duct 267A fashioned in the stator 258, a plurality of second radial orifices 267B (a single one of them being shown here) fashioned in the stator 258 and linking the axial duct 267A to the periphery of the stator 258, a second circumferential groove 267C fashioned between the rotor 259 and the stator 258 and into which each radial orifice 267B opens, and a plurality of second radial ducts 267D, fashioned in the rotor 259, extending radially from the groove 267C all the way to a second supply channel 268 of the second fluid chamber 114 formed in the frame 72.

The second axial duct 267A has an axial extension parallel to the axis X. Advantageously, it is coaxial with the first axial duct 265A. In the example shown, it is in particular straight and coaxial with the axis X. In a variant (not shown), the second axial duct 267A is curved and/or also has a radial extension along a direction orthogonal to the axis X.

Moreover, the second axial duct 267A has, in the example shown, an annular radial section, i.e. it is solid at its center. Here, it extends around the first axial duct 265A.

Each second radial orifice 267B has a radial extension along a radial direction orthogonal to the axis X. In the example shown, each second radial orifice 267B is in particular straight along a radial direction. In a variant (not shown), at least a second radial orifice 267B is curved and/or also has an axial extension parallel to the axis X.

Each second radial orifice 267B is here disposed axially downstream of the first radial orifices 265B.

The second circumferential groove 267C extends parallel to a radial plane orthogonal to the axis X. Here it is disposed axially downstream of the first circumferential groove 265C.

Each second radial duct 267D has a radial extension along a radial direction orthogonal to the axis X. In the example shown, each second radial duct 267D is in particular straight along a radial direction. In a variant (not shown), at least a second radial duct 267D is curved and also has an axial extension parallel to the axis X and/or a circumferential extension along a direction orthogonal to the axis X and to the radial direction.

Each second radial duct 267D is here disposed axially downstream of the first radial ducts 265D.

The second supply channel 268 extends from an outlet of the second radial ducts 266D all the way to an inlet of the second fluid chamber 114. In the example shown, it is substantially straight and extends substantially parallel to the axis X.

The first and second circuits 260, 261 are independent circuits, i.e. they are not in fluid communication with one another.

Here, the fluid transfer bearing 257 is also configured to supply the counterbalance actuator 250 with actuating fluid coming from the control system 76. For this purpose, the fluid transfer bearing 257 comprises a third circuit 269 independent of the first and second circuits 260, 261.

The third circuit 261 comprises a third axial duct 270A fashioned in the stator 258, a plurality of third radial orifices 270B (only one of them being shown here) fashioned in the stator 258 and linking the axial duct 270A to the periphery of the stator 258, a third circumferential groove 270C fashioned between the rotor 259 and the stator 258 and into which each radial orifice 270B opens, and a plurality of third radial ducts 270D, fashioned in the rotor 259, extending radially from the groove 270C all the way to a third supply channel 271 of the counterbalance actuator 250, formed in the frame 72.

The third axial duct 270A has an axial extension parallel to the axis X. Advantageously, it is coaxial with the first and second axial ducts 265A, 267A. In the example shown, it is in particular straight and coaxial with the axis X. In a variant (not shown), the third axial duct 270A is curved and/or also has a radial extension along a direction orthogonal to the axis X.

Moreover, the third axial duct 270A has, in the example shown, a solid radial section. Here, it extends in the center of the first and second axial ducts 265A, 267A.

Each third radial orifice 270B has a radial extension along a radial direction orthogonal to the axis X. In the example shown, each third radial orifice 270B is in particular straight along a radial direction. In a variant (not shown), at least a third radial orifice 270B is curved and/or also has an axial extension parallel to the axis X.

Each third radial orifice 270B is here disposed axially upstream of the first and second radial orifices 265B, 267B.

The third circumferential groove 270C extends parallel to a radial plane orthogonal to the axis X. Here it is disposed axially upstream of the first and second circumferential grooves 265C, 267C.

Each third radial duct 270D has a radial extension along a radial direction orthogonal to the axis X. In the example shown, each third radial duct 270D is in particular straight along a radial direction. In a variant (not shown), at least one third radial duct 270D is curved and also has an axial extension parallel to the axis X and/or a circumferential extension along a direction orthogonal to the axis X and to the radial direction.

Each third radial duct 270D is here disposed axially upstream of the first and second radial orifices 265D, 267D.

The third supply channel 271 extends from an outlet of the third radial ducts 266D all the way to an inlet of the counterbalance chamber 254. In the example shown, it comprises a straight axial portion extending substantially parallel to the axis X upstream from the outlet of the third radial ducts 266D all the way to one end of said portion and a straight radial portion extending substantially orthogonally to the axis X from the upstream end of the axial portion all the way to the inlet of the counterbalance chamber 254.

Returning to FIG. 3, the guide bearing 257 has an outer diameter less than an inner diameter of the guide bearing 53 of the fan rotor 54. It is disposed upstream of the reduction gear and is in particular housed in the housing 82 delimited by the base 80.

The guide bearing 257 is thus surrounded, at least in part, by the control actuator 74. In particular, the control actuator 74 extends along the axis X around more than half, advantageously around more then three quarters, of the fluid transfer bearing 257. To arrive at this measurement, one takes into consideration the axial ends of the control actuator 74 and of the guide bearing 257, these being defined as follows:

for the control actuator 74, its axial ends consist of the track limits of the movable part 102;

for the guide bearing 257, its axial ends consist of the limits beyond which the rotor 259 and the stator 258 no longer coexist (i.e. starting from the center of the guide bearing, the first axial end of the rotor 259 or of the stator 258 encountered delimits an axial end of the guide bearing 257).

A method for changing the pitch of the blades 56, implemented by the pitch change mechanism 70 according to the first embodiment, will now be described.

During a first step of this method, the command module 135 first receives a setting instruction with the aim of increasing the pitch of the blades 56. The command module 135 then transmits to the pressure control unit 132 a command signal intended to increase the fluid pressure in the first chamber 112. Since the fluid pressure in the first chamber 112 increases, the movable part 102 of the control actuator 74 is displaced in the second direction, toward its extended position, which, by way of the linking system 78, drives the pivoting of the blades 56 toward the large pitches (i.e. toward the feathered position).

Once the movable part 102 has arrived at an equilibrium position, it stabilizes, the blades 56 keeping a fixed orientation.

During a second step of the pitch-changing method, the command module 135 first of all receives a setting instruction with the aim of reducing the pitch of the blades 56. The command module 135 then transmits to the pressure control unit 132 a command signal intended to increase the fluid pressure in the second chamber 114. Since the fluid pressure in the second chamber 114 increases, the movable part 102 of the control actuator 74 is displaced in the first direction toward its retracted position, which, by way of the linking system 78, drives the pivoting of the blades 56 toward the small pitches (i.e. toward the flat position).

Once the movable part 102 arrived in an equilibrium position, it stabilizes, the blades 56 keeping a fixed orientation.

Optionally, the pitch change method also comprises, following the first or the second step, a step of commanded locking of the orientation of the blades 56.

During this step, the command module 135 transmits to the pressure control unit 132 a pitch locking command. Under the effect of this command, the pressure control unit 132 fluidly connects the fluid connection circuit 256 to the return line 136, causing a drop in the fluid pressure in the counterbalance chamber 254. The fluid pressure in said chamber 254 is then insufficient to counterbalance the biasing on the biasing device 240, which thus drives the displacement of the support member 162 into its locking position.

During this displacement, the screw 176, while translating, rotates about the longitudinal axis X under the effect of the resistance imposed by the assembly of the nut 178 and of the rollers 194 (which are kept translationally immovable by the control actuator 74) until its stop surface 186 comes to bear against the stop block 92 of the frame 72, locking the rotation of the screw 176 about the longitudinal axis X and its translation along the same axis X.

The blades 56 are thus locked in their orientation even in the event of loss of fluid pressure in the same chamber 112.

In the event of loss of pressure in the second chamber 114 only, the movable part 102 of the control actuator 74 is displaced in the second direction under the effect of the pressure difference between the two chambers 112, 114, driving with it the screw 176 and the support member 162, which finds its operating position. The movable part 102 is therefore no longer immobilized and can continue to be displaced in the second direction until the blades 56 regain the feathered position.

In the event of a malfunction of the control system 76, typically in the event of a fault of the pressure generator 130, the pitch change method comprises an additional step of non-commanded locking of the orientation of the blades 56.

During this step, the malfunction of the control system 76 causes a drop in the fluid pressure in the counterbalance chamber 254, typically because the pressure generator 130 is no longer capable of bringing the actuating fluid to the third pressure. The fluid pressure in said chamber 254 is then insufficient to counterbalance the biasing of the biasing device 240, which thus drives the displacement of the support member 162 into its locking position.

During this displacement, the screw 176 drives with it the nut 178 and the rollers 194, which are no longer kept translationally immovable due to the loss of supply to the control actuator 74. The blades 56 therefore pivot very slightly toward the small pitches, until the stop surface 186 of the screw 176 comes to bear against the stop block 92 of the frame 72, locking the rotation of the screw 176 about the longitudinal axis X and its translation along the same axis X.

The pivoting of the blades 56 toward the small pitches is then prevented by the locking device 160.

The step of non-commanded locking is followed by a step of safetying of the fan 50. During this step, the emergency circuit 134 is activated and supplies the first fluid chamber 112 with actuating fluid in such a way as to increase the fluid pressure in this chamber. Under the effect of this pressure increase, the movable part 102 is displaced in the second direction, driving with it the screw 176 and the support member 162, which regains its operating position. The movable part 102 is therefore no longer immobilized and can continue to be displaced downstream until the blades 56 regain the feathered position.

Note that these different steps can be implemented independently of one another.

A second embodiment of the pitch change mechanism 70 will now be described, with reference to FIG. 11.

In this embodiment, the pitch change mechanism 70 comprises a frame 272, a control actuator 274, a system 276 for controlling the control actuator 274 and a linking system 278.

The frame 272 is secured to the hub 55 and typically consists of a part of the hub 55. It is thus fixed in relation to the pivot axes P.

In the example shown, the frame 272 comprises an upstream assembly 280 and a downstream assembly 282 spaced apart from one another along the longitudinal axis X. Each of these assemblies 280, 282 is centered on the longitudinal axis X and extends from the longitudinal axis X all the way to the housing 62, the upstream assembly 280 being disposed upstream of the housing 62 and the downstream assembly 282 being disposed downstream of the housing 62.

The upstream assembly 280 is in particular formed by an upstream flange 284 in a general dome shape housing at its center a blind cylinder 286. The blind cylinder 286 is closed at its upstream end 288 and open at its downstream end 289. It projects upstream in relation to the flange 284.

The upstream assembly 280 has at its center an orifice 290 opening downstream. This orifice 290 is in particular fashioned in the upstream end 288 of the blind cylinder 286. The upstream assembly 280 also has a stop block 291 oriented downstream. This stop block 291 is here formed in the downstream face of the upstream end 288 of the blind cylinder 286. It extends substantially radially and is in particular arranged around the orifice 290.

Here the downstream assembly 282 comprises a downstream flange 292 housing at its center two concentric cylinders 294, 296: a central cylinder 294, closed at its upstream end 298, and a peripheral cylinder 296 surrounding the central cylinder 294 and delimiting with the central cylinder 294 a peripheral cavity 300 closed at its downstream end 302. The central cylinder 294 defines a housing 304.

Figure 11:
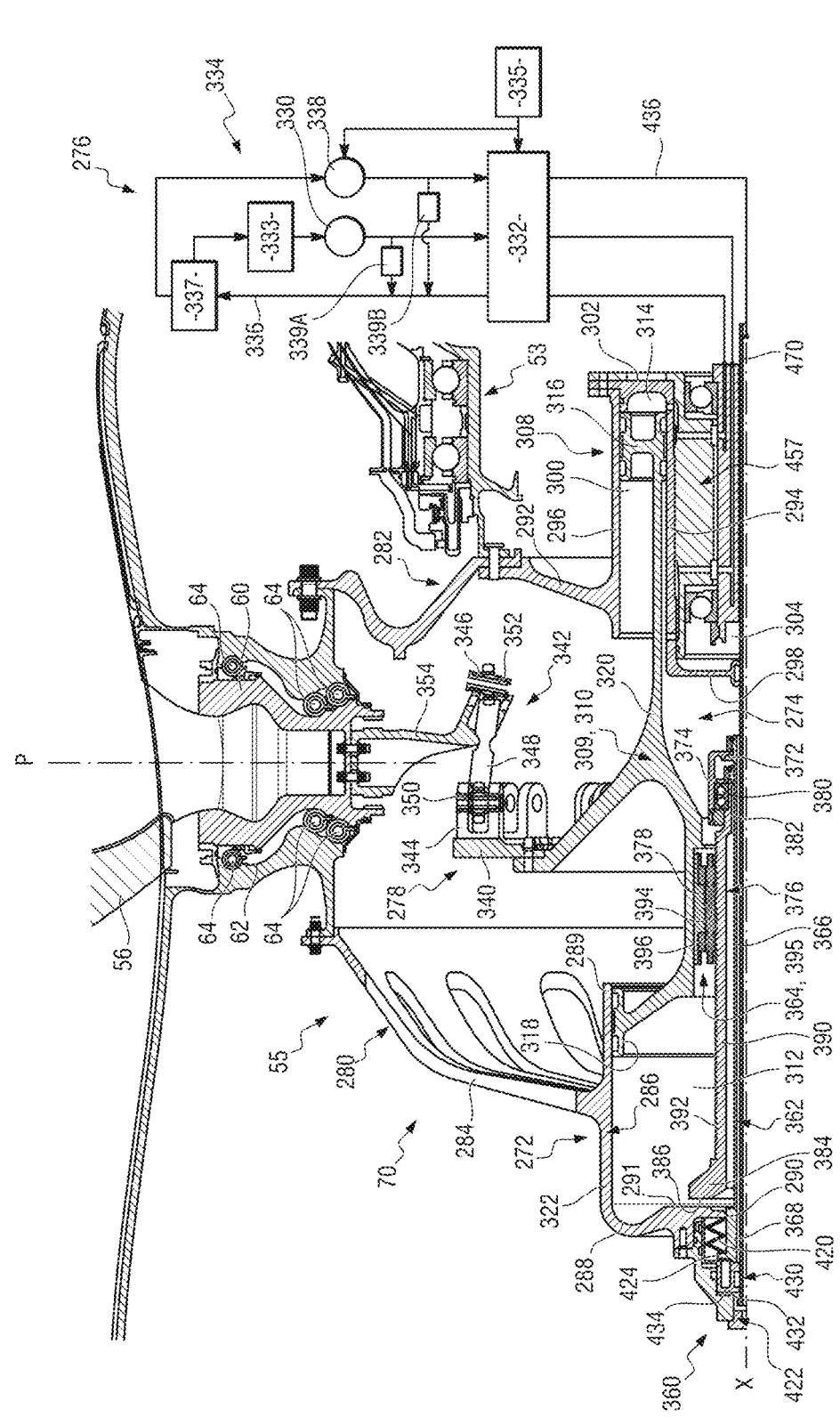
FIG. 11 is a simplified longitudinal section view of a part of a pitch change mechanism of the turbomachine of FIG. 2 according to a second embodiment.

The control actuator 274 includes a fixed part 308, secured to the frame 72, and a movable part 309 translationally movable along the longitudinal axis X in relation to the fixed part 308 between a retracted position, shown on FIG. 11, and an extended position shown (not shown). Optionally, the movable part 309 is also rotationally movable about the longitudinal axis X over a restricted angle, for example in the order of 5°.

The control actuator 274 in particular comprises a piston 310 forming the movable part 309.

The control actuator 274 also comprises a first fluid chamber 312 and a second fluid chamber 314 each delimited between the control piston 310 and the frame 272. Said fluid chambers 312, 314 each contain an actuating fluid, typically consisting of an oil, which is at a first pressure in the first fluid chamber 312 and at a second pressure in the second fluid chamber 314. The first and second fluid chambers 312, 314 are arranged so that the relative increase of the first pressure (i.e. in relation to the second pressure) drives the displacement of the piston 310 toward its retracted position, the relative increase of the second pressure (i.e. in relation to the first pressure) causing the displacement of the piston 310 toward its extended position.

In the example shown, the piston 310 comprises a sealing and downstream guiding bush 316, an upstream sealing and guiding bush 318 and a cylindrical body 320 extending from the downstream sealing and guiding bush 316 to the upstream sealing and guiding bush 318. The downstream sealing and guiding bush 316 is housed in the peripheral cavity 300 and extends from the central cylinder 294 all the way to the peripheral cylinder 296 while forming a seal with each of these cylinders 294, 296. The upstream sealing and guiding bush 318 is housed in the blind cylinder 286 and forms a seal with the peripheral wall 322 of the blind cylinder 286. The first fluid chamber 312 is thus delimited at its downstream end by the downstream sealing and guiding bush 316, at its upstream end by the upstream end 288 of the blind cylinder 286, and at its periphery by the body 320 of the piston 310 and by the peripheral wall 322 of the blind cylinder 286. The second fluid chamber 314, meanwhile, consists of the portion of the peripheral cavity 300 between the downstream sealing and guiding bush 316 and the downstream end 302 of said peripheral cavity 300.

The control system 276 comprises a pressure generator 330 to bring the actuating fluid to a third pressure greater than the first and second pressure, a pressure control unit 332 for adjusting the pressure of the actuating fluid in the first and second fluid chambers 312, 314 by means of the third pressure, and a return line 336 for expelling the depressurized actuating fluid. The control system 276 also comprises a main reservoir 333, an emergency circuit 334 and a command module 335.

The pressure generator 330 for example comprises a pump able to pump the fluid to bring it to the third pressure, for example 100 bars. A main overpressure valve 339A makes it possible to expel a part of the actuating fluid toward the return line 336 when the actuating fluid downstream of the pressure generator 330 exceeds the third pressure.

The pressure control unit 332 is supplied with actuating fluid at the third pressure by the pressure generator 330. It is fluidly connected to the first fluid chamber 312 and to the second fluid chamber 314. It is able to distribute the actuating fluid between the first fluid chamber 312 and the second fluid chamber 314 in such a way as to adjust the fluid pressure inside each of these chambers 312, 314 and, thus, adjust the position of the piston 310 between its retracted and extended positions. It is also able to expel actuating fluid coming from the first and second fluid chambers 312, 314 through the return line 336.

The main reservoir 333 is configured to collect depressurized actuating fluid coming from the return line 336. It supplies the pressure generator 330.

The emergency circuit 334 is able to supply the second fluid chamber 314 with actuating fluid in such a way as to displace the piston 310 toward its retracted position in the event of a failure of the pressure generator 330. For this purpose, the emergency circuit 334 comprises an auxiliary reservoir 337 and an auxiliary pump 338. In the example shown it also comprises an auxiliary overpressure valve 339B.

The auxiliary reservoir 337 is configured to collect depressurized actuating fluid coming from the return line 336. It supplies the auxiliary pump 338. In the example shown, it also supplies the main reservoir 333, the depressurized actuating fluid coming from the return line 336 being transported via the auxiliary reservoir 337 before reaching the main reservoir 333.

The auxiliary pump 338 is able to pump the actuating fluid in the auxiliary reservoir 337 to bring it to the third pressure. It is fluidly connected to the pressure control unit 332 in such a way to supply it with actuating fluid at the third pressure, the pressure control unit 332 being configured to redirect the entirety of the actuating fluid coming from the auxiliary pump 338 toward the second fluid chamber 314.

The overpressure valve 339B is able to expel a part of the actuating fluid toward the return line 336 when the pressure of the actuating fluid downstream of the auxiliary pump 338 exceeds the third pressure.

The command module 335 is configured to receive a setting instruction (not shown) and to deduce therefrom a command signal transmitted to the pressure control unit 332. In particular, the command module 335 is configured to transmit to the pressure control unit 332 a command signal intended to increase the fluid pressure in the second chamber 314 when the setting instruction has the aim of increasing the pitch of the blades 56, and to transmit to the pressure control unit 332 a command signal intended to increase the fluid pressure in the first chamber 312 when the setting instruction has the aim of reducing the pitch of the blades 56.

The command module 335 is also configured to transmit to the emergency circuit 334, and more specifically to its auxiliary pump 338, an instruction to start in the event of a malfunction of the pressure generator 330.

The linking system 278 links the piston 310 to each blade 56 so as to convert the translation of the piston 310 along the longitudinal axis X and, where applicable, the rotation of the piston 310 about the longitudinal axis X into a rotation of each blade 56 about its pivot axis P.

For this purpose, the linking system 278 comprises a synchronization ring 340 secured to the piston 310 and, for each of the blades 56, a mechanism 342 for linking the blade 56 with the synchronization ring 340.

The synchronization ring 340 extends in a radial plane around the piston 310.

Each linking mechanism 342 comprises a first articulation 344 secured to the piston 310, a second articulation 346 secured to the blade 56, away from the pivot axis P of said blade 56, and a rod 348 linking the first articulation 344 to the second articulation 346.

The first articulation 344 is carried by a synchronization ring 340. Here it consists of a ball joint.

The second articulation 346 also consists of a ball joint. It is off-center in relation to the pivot axis P.

The rod 348 has a first end 350 articulated with the first articulation 344 and a second end 352 articulated with the second articulation 346. Advantageously, the rod 348 is of adjustable length, i.e. the distance between the first and second ends 350, 352 can be modified, which makes it possible to precisely adjust the control of the setting angle of each blade 56 by the pitch change mechanism 70.

In the example shown each linking mechanism 342 also comprises an eccentric part 354 connecting the fastening part 60 to the second articulation 346.

The linking system 278 is arranged so that the displacement of the piston 310 toward the stop block 291, i.e. toward its extended position, drives the rotation of each blade 56 toward its flat position, and so that the displacement of the piston 310 away from the stop block 291, i.e. toward its retracted position, drives the rotation of each blade 56 toward its feathered position. For this purpose, the second articulation 346 is placed, in relation to the plane Q orthogonal to the chord C and containing the pivot axis P, on the side of the trailing edge 57B, i.e. opposite, in relation to the pivot axis P, the position occupied by the second articulation 146 in the embodiment of FIGS. 4 to 10.

Note that, in the example shown on FIG. 11, the first articulation 344 is disposed upstream of the second articulation 346. This consequence of this is that, when the pitch change mechanism 70 is immobilized, the natural stresses on the blade 56 toward its flat position make the linking member 348 work under compression, entailing a risk of buckling of said linking member 348. To avoid this risk of buckling of the linking member 348 and be able to use a lighter linking member 348, a variant (not shown) will be preferred in which the first articulation 344 is disposed downstream of the second articulation 346. This is because its particular arrangement, like that of the first embodiment, allows the natural stressing of the blade 56 toward its flat position to make the linking member 348 work under traction and not under compression when the pitch change mechanism 70 is immobilized.

The pitch change mechanism 70 further comprises a pitch locking device 360 suitable for locking the translation of the piston 310 in relation to the frame 272 toward its extended position.

This locking device 360 comprises a support member 362 and a screw-and-nut system 364.

The support member 362 is translationally movable in relation to the frame 272 along the longitudinal axis X between an operating position, shown on FIG. 11, and a locking position (not shown).

The support member 362 comprises a body 366 elongated along the longitudinal axis X and centered on the longitudinal axis X. Said body 366 has a first longitudinal end 368, in particular an upstream longitudinal end, engaged through the hole 290 of the frame 272, and a free second longitudinal end 372. Moreover, in the example shown, the body 366 is hollow and is open at both its longitudinal ends 368, 372.

The support member 362 also comprises a skirt 374 secured to the body 366 and arranged around the second longitudinal end 372 of the body 366.

The screw-and-nut system 364 comprises a screw 376 and a nut 378.

The screw 376 extends around the body 366 of the support member 362 and is coaxial with said body 366. It is translationally secured to the support member 362 and mounted movably in rotation about the longitudinal axis X in relation to the support member 362. For this purpose, the screw 376 is assembled on the support member 362 by way of a bearing 380. This bearing 380 is here inserted between the skirt 374 of the support member 362 and an end portion 382 of the screw 376, housed between the body 366 and the skirt 374.

The screw 376 has a second longitudinal end portion 384 opposite the end portion 382. This second longitudinal end portion 384 defines a radial stop portion 386. This stop surface 386 is at a distance from the frame 272 when the support member 362 is in the operating position and bearing against the stop block 291 of the frame 272 when the support member 362 is in the locking position.

Here, the second longitudinal end portion 384 flares out from a threaded body 390 of the screw 376 all the way to the stop surface 386. Thus, the contact surface between the stop surface 386 and the stop block 291 increased, which increases the friction forces between the stop surface 386 and the stop block 291 and allows a better transmission of the braking and locking efforts.

Here the stop surface 386 and the stop block 291 are both smooth. In a variant (not shown), the stop surface 386 and/or the stop block 291 have asperities, in such a way as to yet further increase the friction forces between the stop surface 386 and the stop block 291 and allow an even greater transmission of the efforts.

The threaded body 390 extends from one to the other of the end portions 382, 384. It has an outer threading 392 on its periphery.

The nut 378 is secured to the piston 310 and coaxial with the screw 376. It interacts with the screw 376 so that a translation of the nut 378 along the longitudinal axis X in relation to the screw 376 drives the rotation of the screw 376 about the longitudinal axis X in relation to the support member 362.

The nut 378 has an inner tapping 394.

The screw-and-nut system 364 is in particular formed by a reversible planetary roller screw system 395. Conventionally, this planetary roller screw system 395 comprises, besides the screw 376 and the nut 378, a plurality of rollers 396 interposed between the screw 376 and the nut 378, each roller 396 being elongated parallel to the longitudinal axis X.

Preferably, the description given above of the planetary roller screw system 195 is applicable mutatis mutandis to the planetary roller screw system 395.

This feature allows a good transmission of the efforts of the nut 378 on the screw 376 by the screw-and-nut system 364, while keeping a small pitch in the helical linkage of the screw-and-nut system 364. In particular, in the event of locking of the rotation of the screw 376, it makes it possible to immobilize the nut 378 in relation to the screw 376 even in the absence of a separate locking nut. It is thus possible to dispense with the use of a separate locking nut, which simplifies the manufacturing and reduces the cost of the mechanism, while increasing its reliability and minimizing its mass.

The locking device 360 also comprises a biasing device 420 biasing the support member 362 into its locking position and a retaining device 422 for retaining the support member 362 in its operating position when the pitch change mechanism 70 is under normal operating conditions.

The biasing device 420 here consists of a compression spring compressed between the frame 272 and a shoulder 424 secured to the support member 362.

The retaining device 422 comprises a counterbalance actuator 430 including a counterbalance piston 432 and a counterbalance chamber 434.

The counterbalance piston 432 is secured to the support member 362. It is mounted translationally movable along the longitudinal axis X in relation to the frame 272. It is in particular coaxial with the support member 362. In the example shown, it is arranged in the longitudinal extension of the support member 362.

The counterbalance piston 432 and the frame 272 together delimit the chamber 434.

The counterbalance chamber 434 is fluidly connected to the pressure generator 330 by a fluid connection circuit 436 so as to be supplied with actuating fluid at the third pressure. It is intended to counterbalance the biasing of the biasing device 420 when this supply is active.

For this purpose, the counterbalance actuator 430 is arranged so that the pressure exerted on the piston 432 by the fluid contained in the chamber 434 is oriented in a direction opposite that of the biasing of the biasing device 420: in the example shown, the counterbalance piston 432 is interposed between the chamber 434 and the shoulder 424 and the shoulder 424 is interposed between the piston 432 and the biasing device 420. In addition, the counterbalance piston 432 and the counterbalance chamber 434 are dimensioned so that, when the chamber 434 is supplied with actuating fluid at the third pressure, the force exerted by the actuating fluid on the piston 432 is greater than the biasing of the biasing device 420.

Thus, when the supply to the chamber 434 of actuating fluid at the third pressure is active, the biasing of the biasing device 420 is canceled and the support member 362 kept in the operating position.

In the example shown, the pressure control unit 332 is fluidly interposed between the pressure generator 330 and the fluid connection circuit 436. It has a first configuration, in which it isolates the fluid connection circuit 436 from the return line 336, and a second configuration, in which it fluidly connects the fluid connection circuit 436 to the return line 336.

The pressure control unit 332 is configured to be normally in its first configuration and to switch to its second configuration on receipt of a command instruction transmitted by the command module 335.

Still with reference to FIG. 11, the pitch change mechanism 70 finally comprises a fluid transfer bearing 457 intended to supply the control actuator 274 with actuating fluid coming from the control system 276.

For this purpose, the fluid transfer bearing 457 is configured to transfer the actuating fluid coming from the fixed reference frame attached to the nacelle 20 to the rotary reference frame attached to the fan rotor 54 and more specifically to the first and second chambers 312, 314 of the control actuator 274.

Figure 12:
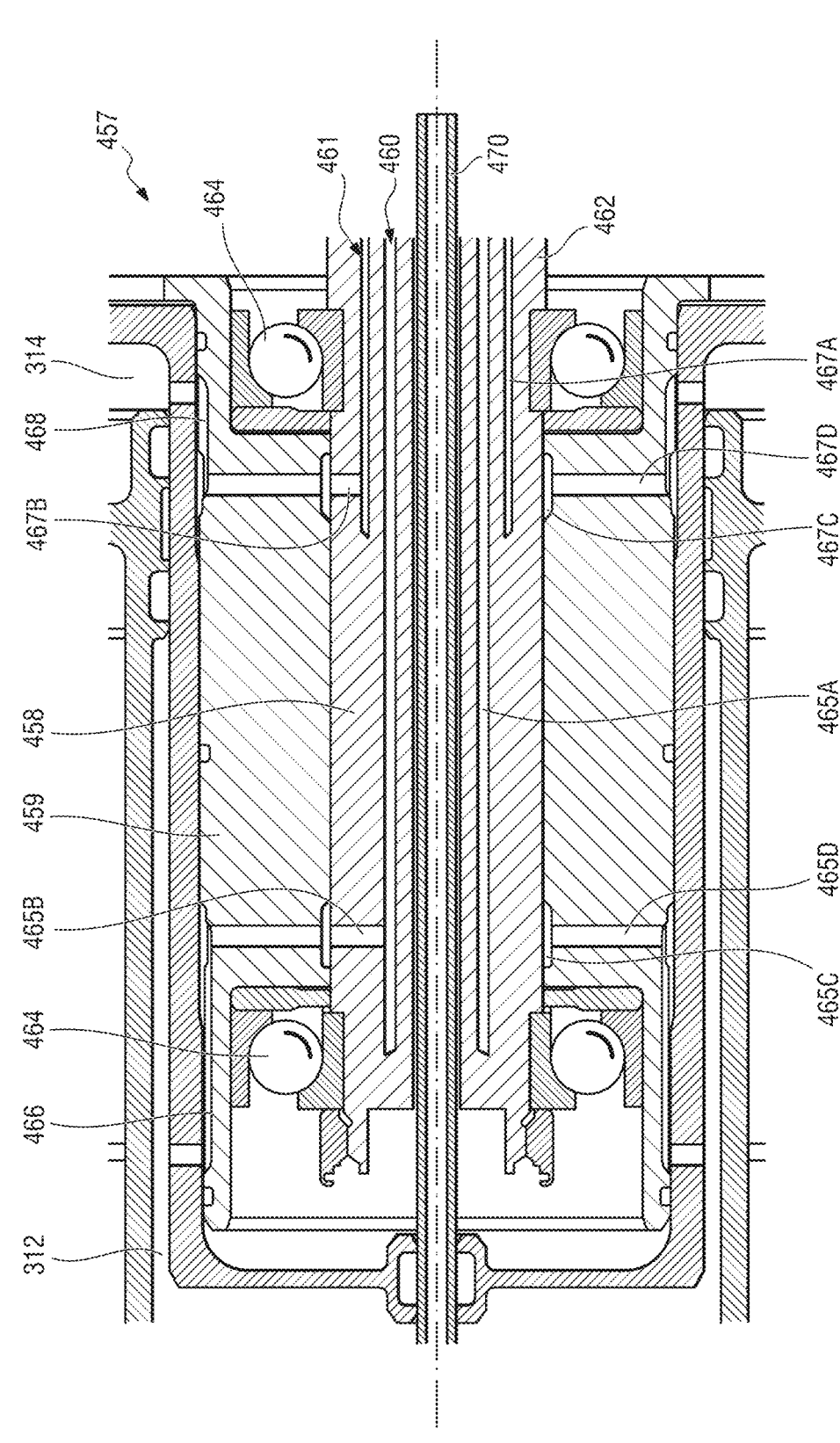
FIG. 12 is a detail view of a fluid transfer bearing of the pitch change mechanism of FIG. 11

To do this, the fluid transfer bearing 457 comprises, with reference to FIG. 12, a stator 458 which is fixed with respect to the nacelle 20 and a rotor 459 which is jointly movable with the fan rotor 54 (and therefore with the control actuator 274) about the longitudinal axis X in relation to the stator 458. It also comprises a first circuit 460 fluidly connected to the first fluid chamber 312 for supplying said first fluid chamber 312 with actuating fluid supplied by the control system 276 and a second circuit 461 fluidly connected to the second fluid chamber 314 for supplying said second fluid chamber 114 with actuating fluid supplied by the control system 76.

The stator 458 is in the shape of a cylinder of revolution coaxial with the longitudinal axis X. It is linked by its downstream end 462 to a structure (not shown) of the nacelle 20.

The rotor 459 is in the shape of a cylinder of revolution coaxial with the longitudinal axis X. It extends around the stator 458. Its periphery is in contact with the frame 272. It is rotationally guided about the axis X with respect to the stator 458 by way of bearings 464 interposed between the rotor 459 and the stator 458.

The fluid transfer bearing 457 is thus coaxial with the axis X. It is therefore also coaxial with the control actuator 274.

The first circuit 460 comprises a first axial duct 465A fashioned in the stator 458, a plurality of first radial orifices 465B (only one of them being shown here) fashioned in the stator 458 and linking the axial duct 465A to the periphery of the stator 458, a first circumferential groove 465C fashioned between the rotor 459 and the stator 458 and into which each radial orifice 465B opens, and a plurality of first radial ducts 465D, fashioned in the rotor 459, extending substantially from the groove 465C all the way to a first supply channel 466 of the first fluid chamber 112 formed between the frame 72 and the rotor 459.

The first axial duct 465A has an axial extension parallel to the axis X. In the example shown, it is in particular straight and coaxial with the axis X. In a variant (not shown), the first axial duct 465A is curved and/or also has a radial extension along a direction orthogonal to the axis X.

Moreover, the first axial duct 465A has, in the example shown, an annular radial section, i.e. it is solid at its center.

Each first radial orifice 465B has a radial extension along a radial direction orthogonal to the axis X. In the example shown, each first radial orifice 465B is in particular straight along a radial direction. In a variant (not shown), at least one first radial orifice 465B is curved and/or also has an axial extension parallel to the axis X.

The first circumferential groove 465C extends parallel to a radial plane orthogonal to the axis X.

Each radial first duct 465D has a radial extension along a radial direction orthogonal to the axis X. In the example shown, each first radial duct 465D is in particular straight along a radial direction. In a variant (not shown), at least one radial first duct 465D is curved and also has an axial extension parallel to the axis X and/or a circumferential extension along a direction orthogonal to the axis X and to the radial direction.

The first supply channel 466 extends from an outlet of the first radial ducts 465D all the way to an inlet of the first fluid chamber 312. In the example shown, it is substantially straight and extends substantially parallel to the axis X.

The second circuit 461 comprises a second axial duct 467A fashioned in the stator 458, a plurality of second radial orifices 467B (only one of them being shown here) fashioned in the stator 458 and linking the axial duct 467A to the periphery of the stator 458, a second circumferential groove 467C fashioned between the rotor 459 and the stator 458 and into which each radial orifice 467B opens, and a plurality of second radial ducts 467D, fashioned in the rotor 459, extending radially from the groove 467C all the way to a second supply channel 468 of the second fluid chamber 114 formed between the frame 72 and the rotor 459.

The second axial duct 467A has an axial extension parallel to the axis X. Advantageously, it is coaxial with the first axial duct 465A. In the example shown, it is in particular straight and coaxial with the axis X. In a variant (not shown), the second axial duct 467A is curved and/or also has a radial extension along a direction orthogonal to the axis X.

Moreover, the second axial duct 467A has, in the example shown, an annular radial section, i.e. it is solid at its center. Here, it extends around the first axial duct 465A.

Each second radial orifice 467B has a radial extension along a radial direction orthogonal to the axis X. In the example shown, each second radial orifice 467B is in particular straight along a radial direction. In a variant (not shown), at least one second radial orifice 467B is curved and/or also has an axial extension parallel to the axis X.

Each second radial orifice 467B is here disposed axially downstream of the first radial orifices 465B.

The second circumferential groove 467C extends parallel to a radial plane orthogonal to the axis X. It is here disposed axially downstream of the first circumferential groove 465C.

Each second radial duct 467D has a radial extension along a radial direction orthogonal to the axis X. In the example shown, each second radial duct 467D is in particular straight along a radial direction. In a variant (not shown), at least one second radial duct 467D is curved and also has an axial extension parallel to the axis X and/or a circumferential extension along a direction orthogonal to the axis X and to the radial direction.

Each second radial duct 467D is here disposed axially downstream of the first radial ducts 465D.

The second supply channel 468 extends from an outlet of the second radial ducts 466D all the way to an inlet of the second fluid chamber 314. In the example shown, it is substantially straight and extends substantially parallel to the axis X.

The first and second circuits 460, 461 are independent circuits, i.e. they are not in fluid communication with one another.

Returning to FIG. 11, the guide bearing 457 has an outer diameter less than an inner diameter of the guide bearing 53 of the fan rotor 54. It is disposed upstream of the reduction gear and is in particular housed in the housing 304 delimited by the central cylinder 294.

The guide bearing 457 is thus surrounded, at least in part, by the control actuator 274. In particular, the control actuator 274 extends along the axis X around more than half, advantageously around more than three quarters, of the fluid transfer bearing 457. To arrive at this measurement, one takes into consideration the axial ends of the control actuator 274 and of the guide bearing 457, these latters being defined as follows:

for the control actuator 274, its axial ends consist of the ends 288, 302 of the fluid chambers 312, 314;

for the guide bearing 457, its axial ends consist of the limits beyond which the rotor 459 and the stator 458 no longer coexist (i.e., starting from the guide bearing, the first axial end of the rotor 459 or of the stator 458 encountered delimits an axial end of the guide bearing 457).

In particular, in the example shown, the control actuator 274 extends along the axis X around the entirety of the fluid transfer bearing 457.

Unlike the fluid transfer bearing 257, the fluid transfer bearing 457 is here not configured to supply the counterbalance actuator 430 with actuating fluid coming from the control system 276. Instead, the stator 458 is axially drilled in its center and traversed by a central duct 470 intended to supply the counterbalance actuator 430.

This central duct 470 is here straight and colinear with the longitudinal axis X. It extends through the fluid transfer bearing 257, but also through the support member 362 and the counterbalance piston 432, all the way to the counterbalance chamber 434.

The central duct 470 is typically fixed in the reference frame of the nacelle 20. In a variant, it is fixed in the rotary reference frame of the fan rotor 54.

A seal is made at the periphery of the central duct 470, between the central duct 470 and the counterbalance piston 432. Advantageously, a second seal is also made at the periphery of the central duct 470, between the central duct 470 and the upstream end 298 of the central cylinder 294, that the central duct 470 traverses at its center.

A method for changing the pitch of the blades 56, implemented by the pitch change mechanism 70 according to the second embodiment, will now be described.

In a first step of this method, the command module 335 first receives a setting instruction with the aim of increasing the pitch of the blades 56. The command module 335 then transmits to the pressure control unit 332 a command signal intended to increase the fluid pressure in the first chamber 312. Since the fluid pressure in the first chamber 312 increases, the control piston 310 is displaced toward its retracted position, which, by way of the linking system 278, drives the pivoting of the blades 56 toward the large pitches (i.e. toward the feathered position).

Once the piston 310 has arrived at its equilibrium position, it stabilizes, the blades 56 keeping a fixed orientation.

In a second step of the pitch-changing method, the command module 335 first receives a setting instruction with the aim of reducing the pitch of the blades 56. The command module 335 then transmits to the pressure control unit 332 a command signal intended to increase the fluid pressure in the second chamber 314. Since the fluid pressure in the second chamber 314 increases, the control piston 310 is displaced toward its extended position, which, by way of the linking system 278, drives the pivoting of the blades 56 toward the small pitches (i.e. into the flat position).

Once the piston 310 has arrived in an equilibrium position, it stabilizes, the blades 56 then keeping a fixed orientation.

Optionally, the pitch change method also comprises, following the first or the second step, a step of commanded locking of the orientation of the blades 56.

During this step, the command module 335 transmits to the pressure control unit 332 a pitch locking command. Under the effect of this command, the pressure control unit 332 fluidly connects the fluid connection circuit 436 to the return line 336, causing a drop in the fluid pressure in the counterbalance chamber 434. The fluid pressure in said chambre 434 is then insufficient to counterbalance the biasing of the biasing device 420, which thus drives the displacement of the support member 362 into its locking position.

During this displacement, the screw 376 rotates about the longitudinal axis X under the effect of the resistance imposed by the assembly of the nut 378 and of the rollers 394 (which are kept translationally immovable by the control actuator 274) until its stop surface 386 comes to bear against the stop block 291 of the frame 272, locking the rotation of the screw 376 about the longitudinal axis X and its translation along the same axis X.

The blades 56 are thus locked in their orientation even in the event of loss of fluid pressure in the first chamber 312.

In the event of loss of fluid pressure in the second chamber 314 only, the piston 310 is displaced toward its retracted position under the effect of the pressure difference between the two chambers 312, 314, driving with it the screw 376 and the support member 362, which regains its operating position. The piston 310 is therefore no longer immobilized and can continue to be displaced toward its retracted position until the blades 56 regain the feathered position.

In the event of a malfunction of the control system 276, typically in the event of a fault in the pressure generator 330, the pitch-changing method comprises an additional step of non-commanded locking of the orientation of the blades 56.

During this step, the malfunction of the control system 276 causes a drop in the fluid pressure in the counterbalance chamber 434, typically because the pressure generator 330 is no longer able to bring the actuating fluid to the third pressure. The fluid pressure in said chamber 434 is then insufficient to counterbalance the biasing of the biasing device 420, which thus drives the displacement of the support member 362 into its locking position.

During this displacement, the screw 376 drives with it the nut 378 and the rollers 394, which are no longer kept translationally immovable due to the loss of power to the control actuator 274. The blades 56 therefore pivot slightly toward the small pitches, until the stop surface 386 of the screw 376 comes to bear against the stop block 291 of the frame 272, locking the rotation of the screw 376 about the longitudinal axis X and its translation along the same axis X.

The pivoting of the blades 56 toward the small pitches is then prevented by the locking device 360.

The step of non-commanded locking is followed by a step of safetying of the fan 50. During this step, the emergency circuit 334 is activated and supplies the first fluid chamber 312 with actuating fluid in such a way as to increase the fluid pressure in this chamber. Under the effect of this pressure increase, the piston 310 is displaced toward its retracted position, driving with it the screw 376 and the support member 362, which regains its operating position. The piston 310 is thus no longer immobilized and can continue to be displaced downstream until the blades 45 regain the feathered position.

Note that these different steps can be implemented independently of one another.

Thus, owing to the exemplary embodiments described above, the fluid transfer bearing 257, 457 is made easily accessible, since it is disposed upstream of the reduction gear, without this being at the expense of the length of the turbomachine 12, owing to the careful positioning of the fluid transfer bearing 257, 457 inside a cavity surrounded by the control actuator 74, 274. In addition, the bulk of the fluid transfer bearing 257, 457 itself is minimized.

These exemplary embodiments also make it possible to dispense with the use of a locking nut separate from the nut 178, 378 of the screw-and-nut system 164, 364. This results in a locking device 160, 360 and hence a pitch change mechanism 70 for which the manufacturing is simplified, the cost reduced and the reliability increased.

Moreover, the exemplary embodiments of FIGS. 3 to 9 make it possible to simplify the pitch change mechanism 70 owing to the compactness of the control actuator 74 and the use of linking members 148 which are less resistant and therefore lighter.

Said exemplary embodiments of FIGS. 3 to 9 also make it possible to save on the use of a support disposed upstream of the locking device 160, which facilitates access to the pitch change mechanism 70, and more specifically, to the linking system 78, once it is assembled.

These exemplary embodiments of FIGS. 3 to 9 finally allow a great degree of precision in the control of the setting angle of the blades 56, which allows for a closely-spaced installation of blades 56 of large size and complex geometry on the hub 55, thus making it possible to increase the efficiency of the turbomachine 12.

The invention claimed is:

1. A pitch change mechanism for adjusting an angular position of at least one variable-setting blade around a pivot axis of the variable-setting blade, said pitch change mechanism comprising:

a frame which is fixed in relation to the pivot axis, a control actuator including a fixed part secured to the frame and a movable part, translationally movable along a longitudinal axis in relation to the fixed part, a linking system linking the movable part to the variable-setting blade so as to convert a translation of the movable part in relation to the fixed part along the longitudinal axis into a rotation of the variable-setting blade about the pivot axis, and a fluid transfer bearing for supplying the control actuator with actuating fluid coming from a source in relation to which the control actuator is rotationally movable about the longitudinal axis, wherein the control actuator extends at least partially around the fluid transfer bearing.

2. The pitch change mechanism as claimed in claim 1, wherein the control actuator is coaxial with the fluid transfer bearing.

3. The pitch change mechanism as claimed in claim 1, wherein the control actuator extends around more than half of the fluid transfer bearing.

4. The pitch change mechanism as claimed in claim 1, comprising a pitch locking device suitable for locking the translation of the movable part in relation to the fixed part in at least one direction, said pitch locking device comprising:

a locking member, translationally movable in relation to the frame along the longitudinal axis between an operating position and a locking position, a biasing device biasing the locking member towards the locking position, and a retaining device for retaining the locking member in the operating position under normal operating conditions, the retaining device comprising a counterbalance actuator including a counterbalance chamber supplied with actuating fluid to counterbalance the biasing of the biasing device, the fluid transfer bearing being configured to supply the counterbalance actuator with actuating fluid coming from the source.

5. The pitch change mechanism as claimed in claim 1, wherein the fluid transfer bearing comprises a stator and a rotor jointly movable with the control actuator about the longitudinal axis in relation to the stator, the rotor extending around the stator.

6. The pitch change mechanism as claimed in claim 5, wherein the fluid transfer bearing comprises a plurality of circuits independent from one another, at least one of said circuits comprising:

an axial duct fashioned in the stator, at least one radial orifice fashioned in the stator and linking the axial duct to the periphery of the stator, a circumferential groove fashioned between the rotor and the stator and into which the at least one radial orifice opens, and at least one radial duct, fashioned in the rotor, extending radially from the circumferential groove all the way to a supply channel formed in the frame or between the frame and the fluid transfer bearing.

7. The pitch change mechanism as claimed in claim 6, wherein a plurality of the circuits comprise the axial duct fashioned in the stator, said axial ducts being coaxial.

8. The pitch change mechanism as claimed in claim 1, wherein the control actuator comprises a first fluid chamber and a second fluid chamber each containing actuating fluid for actuating displacement of the movable part in relation to the fixed part, and the fluid transfer bearing comprises a first circuit fluidly connected to the first fluid chamber for supplying said first fluid chamber with actuating fluid provided by the source and a second circuit fluidly connected to the second fluid chamber for supplying said second fluid chamber with actuating fluid provided by the source.

9. A fan rotor for a turbomachine comprising a hub and a plurality of variable-setting blades each pivotable in relation to the hub about a respective pivot axis, the rotor further comprising the pitch change mechanism as claimed in claim 1 for adjusting an angular position of each of the variable-setting blades around the respective pivot axis.

10. The fan rotor as claimed in claim 9, comprising a guide bearing for rotationally guiding, about the longitudinal axis, said fan rotor in relation to a turbomachine nacelle, said guide bearing having an inner diameter greater than an outer diameter of the fluid transfer bearing.

11. The fan rotor as claimed in claim 9, wherein the longitudinal axis constitutes an axis of rotation of the fan rotor.

12. The turbomachine comprising the fan rotor as claimed in claim 9.

13. The turbomachine as claimed in claim 12, wherein the longitudinal axis constitutes an axis of elongation of the turbomachine.

14. An aircraft comprising the turbomachine as claimed in claim 12.

15. A method for changing a pitch of blades of a fan rotor for a turbomachine, each blade pivotable in relation to a hub of the fan rotor about a respective pivot axis, said method comprising adjusting an angular position of each of said blades around the respective pivot axis by means of the pitch change mechanism as claimed in claim 1.

16. The method as claimed in claim 15, comprising an additional step of locking the angular position of the blades by means of a pitch locking device of the pitch change mechanism, said pitch locking device comprising:

a locking member, translationally movable in relation to the frame along the longitudinal axis between an operating position and a locking position, a biasing device biasing the locking member towards the locking position, and a retaining device for retaining the locking member in the operating position under normal operating conditions, the retaining device comprising a counterbalance actuator including a counterbalance chamber supplied by the fluid transfer bearing with actuating fluid coming from the source to counterbalance the biasing of the biasing device.

* * * * *